US008543559B2

(12) United States Patent
Yanagi

(10) Patent No.: US 8,543,559 B2
(45) Date of Patent: *Sep. 24, 2013

(54) NETWORK SYSTEM AND COMMUNICATION DEVICE

(75) Inventor: Satoru Yanagi, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/956,880

(22) Filed: Nov. 30, 2010

(65) Prior Publication Data
US 2011/0071998 A1    Mar. 24, 2011

Related U.S. Application Data

(63) Continuation of application No. 12/038,990, filed on Feb. 28, 2008, now Pat. No. 7,921,094.

(30) Foreign Application Priority Data

Feb. 28, 2007  (JP) ................................. 2007-049435
Mar. 29, 2007  (JP) ................................. 2007-089326

(51) Int. Cl.
G06F 17/30    (2006.01)
(52) U.S. Cl.
USPC .......................................... 707/705; 707/706
(58) Field of Classification Search
USPC .................................................. 707/706, 707
See application file for complete search history.

(56) References Cited

U.S. PATENT DOCUMENTS 5,884,032 A    3/1999  Bateman et al.
6,014,672 A    1/2000  Satoh et al.
6,138,116 A *  10/2000 Kitagawa et al. ............. 707/752
(Continued)

FOREIGN PATENT DOCUMENTS

JP    H10-063685 A    3/1998
JP    2001-249933 A   9/2001
(Continued)

OTHER PUBLICATIONS

The State Intellectual Property Office of the People's Republic of China; Notification of first Office Action in Chinese Patent Application No. 200810090733.3 (counterpart to the above captioned US application) mailed Jun. 11, 2010.

(Continued)

Primary Examiner — Baoquoc N To
(74) Attorney, Agent, or Firm — Baker Botts L.L.P.

(57) ABSTRACT

A network system includes a first communication device, a second communication device and a keyword database. The first communication device includes a first input device and a first search device. The first input device allows a user to input a keyword. The first search device is capable of carrying out a first search process that includes sending the keyword input to the first input device to a search engine and receiving a search result. The keyword database stores the keyword used for the first search process. The second communication device is composed separately from the first communication device. The second communication device includes a keyword acquisition device and a second search device. The keyword acquisition device is capable of acquiring the keyword from the keyword database. The second search device is capable of carrying out a second search process that includes sending the keyword acquired by the keyword acquisition device to a search engine and receiving a search result.

6 Claims, 37 Drawing Sheets

(56) References Cited

U.S. PATENT DOCUMENTS

| | | |
|---|---|---|
| 2004/0212824 A1 | 10/2004 | Ohara |
| 2004/0233898 A1 | 11/2004 | Otsuka et al. |
| 2005/0198068 A1* | 9/2005 | Mukherjee et al. ........ 707/104.1 |
| 2006/0077119 A1 | 4/2006 | Zhang et al. |
| 2008/0082318 A1 | 4/2008 | Kataoka et al. |
| 2008/0240386 A1 | 10/2008 | Yanagi |

FOREIGN PATENT DOCUMENTS

| | | |
|---|---|---|
| JP | 2003-167873 A | 6/2003 |
| JP | 2004-078554 A | 3/2004 |
| JP | 2005-031906 A | 2/2005 |
| JP | 2005-148199 A | 6/2005 |
| JP | 2005-322165 A | 11/2005 |
| JP | 2006-139399 A | 6/2006 |
| JP | 2006-155322 A | 6/2006 |
| WO | 2006/109770 A1 | 10/2006 |

OTHER PUBLICATIONS

European Patent Office, European Search Report for the corresponding European Patent Application No. 08251144.5 of the co-pending U.S. Appl. No. 12/057,068, dated Nov. 6, 2008.

Japan Patent Office, Notification of Reasons for Rejection for Japanese Patent Application No. 2007-089326 (counterpart to above-captioned patent application), mailed Jun. 7, 2011.

Shiro Kubota, "Hop! Step! VoIP! (7) CTI and VoIP", Network Magazine, Jun. 1, 2001, vol. 6, No. 6, pp. 118-121. (Concise explanation of relevance provided in attached Notification of Reasons for Rejection for Patent Application No. JP 2007-089326.).

Japan Patent Office, Notification of Reasons for Rejection for Japanese Patent Application No. 2007-049435 (counterpart to above-captioned patent application), mailed Jun. 7, 2011.

Impress Co. Ltd., DOS/V Power Report, Jun. 1, 1999, vol. 9, No. 6, pp. 35 to 37. (Concise explanation of relevance provided in attached Notification of Reasons for Rejection for Patent Application No. JP 2007-049435.).

Japan Patent Office, Notification of Reasons for Rejection for Japanese Patent Application No. 2007-089327 (counterpart to above-captioned patent application), mailed Jun. 14, 2011.

United States Patent and Trademark Office, Office Action for U.S. Appl. No. 12/057,068 (counterpart to above-captioned patent application), dated Oct. 26, 2011.

Japan Patent Office, Decision of Rejection for Japanese Patent Application No. 2007-049435 (counterpart to above-captioned patent application), mailed Dec. 13, 2012.

* cited by examiner

| Search Engine | Keyword |
|---|---|
| http://xxx.kensaku.co.jp | ⋮ |
| http://yyy.serch.com | Keyword<br>Keyboard<br>Kabuki<br>⋮ |
| http://zzz.seek.ne.jp | ⋮ |

50 ... 42 ... 52

Multi Function Device 60
- 62 — Monitor
- 64 — Operating Device
- 66 — Printing Device
- 68 — Storage Device
- 70 — Controller
- 72 — Network I/F — 12

FIG. 25

| User_ID | Keyword | URL for Search Engine | Registration Date and Time |
|---|---|---|---|
| User_A | Baseball | http://www.seach.co.jp | 2007.1.1 13:05 |
| | TV Price | http://www.kensaku.com | 2007.1.5 7:30 |
| | Printer Price | http://www.seek.ne.jp | 2007.1.6 20:15 |
| User_B | Thesis | http://www.seach.co.jp | 2007.1.2 10:24 |
| User_C | IT | http://www.seach.co.jp | 2007.1.1 16:43 |

| User_ID | Phone Number | Node Name |
|---|---|---|
| User_A | 1234 | PC-0001 |
| User_B | 5678 | PC-0002 |
| User_C | 9876 | PC-0003 |

NETWORK SYSTEM AND COMMUNICATION DEVICE

CROSS-REFERENCE TO RELATED APPLICATIONS

This application is a continuation of U.S. patent application Ser. No. 12/038,990, filed Feb. 28, 2008, which claims priority to Japanese Patent Application No. 2007-049435, filed on Feb. 27, 2007, and Japanese Patent Application No. 2007-089326, filed on Mar. 29, 2007, the contents of which are hereby incorporated by reference into the present application.

BACKGROUND OF THE INVENTION

1. Field of the Invention

The present invention relates to technology for a search process that sends a keyword to a search engine in order to acquire a search result.

2. Description of the Related Art

Internet searches are widely performed. For example, a personal computer (hereinafter referred to as a "PC") can send a keyword input by a user with a keyboard to a search engine on the Internet. The search engine searches for sites that include the keyword sent from the PC. The search engine sends the search result to the PC. The PC can display the search result.

As mentioned above, a user can input a keyword into a device by operating a keyboard, etc. In addition, for example, Japanese Patent Application Publication No. 2005-148199 discloses that a user inputs a keyword into a device by means of voice. A user can input a keyword by saying a keyword into a microphone without operating a keyboard, etc. The user can easily input a keyword.

BRIEF SUMMARY OF THE INVENTION

As mentioned above, there are various technologies for inputting a keyword into a device. These technologies are useful, but are not necessarily the best method. The present specification provides technology to input a keyword into a device. This technology makes it possible to use a method different from previously existing methods. As a result, this technology assists a user with the task of inputting into a device, a keyword for searching.

The present specification teaches a network system. The network system includes a first communication device, a second communication device and a keyword database. The first communication device includes a first input device and a first search device. The first input device allows a user to input a keyword. The first search device is capable of carrying out a first search process that includes sending the keyword input to the first input device to a search engine and receiving a search result. The keyword database stores the keyword used for the first search process. The second communication device is composed separately from the first communication device. The second communication device includes a keyword acquisition device and a second search device. The keyword acquisition device is capable of acquiring the keyword from the keyword database. The second search device is capable of carrying out a second search process that includes sending the keyword acquired by the keyword acquisition device to a search engine and receiving a search result.

In this network system, in a case where the second communication device carries out the second search process by using a keyword used in the first communication device, the second communication device can use the keyword stored in the keyword database. It is not necessary for the user to input the keyword again. This system can assist a user with the task of inputting a keyword into the second communication device.

BRIEF DESCRIPTION OF THE DRAWINGS

FIG. 25 shows an example of the stored content of a keyword database of the third embodiment.

DETAILED DESCRIPTION OF THE INVENTION

Below, network system embodiments of the present teaching will be described together with figures.

(First Embodiment)

Figure 1:
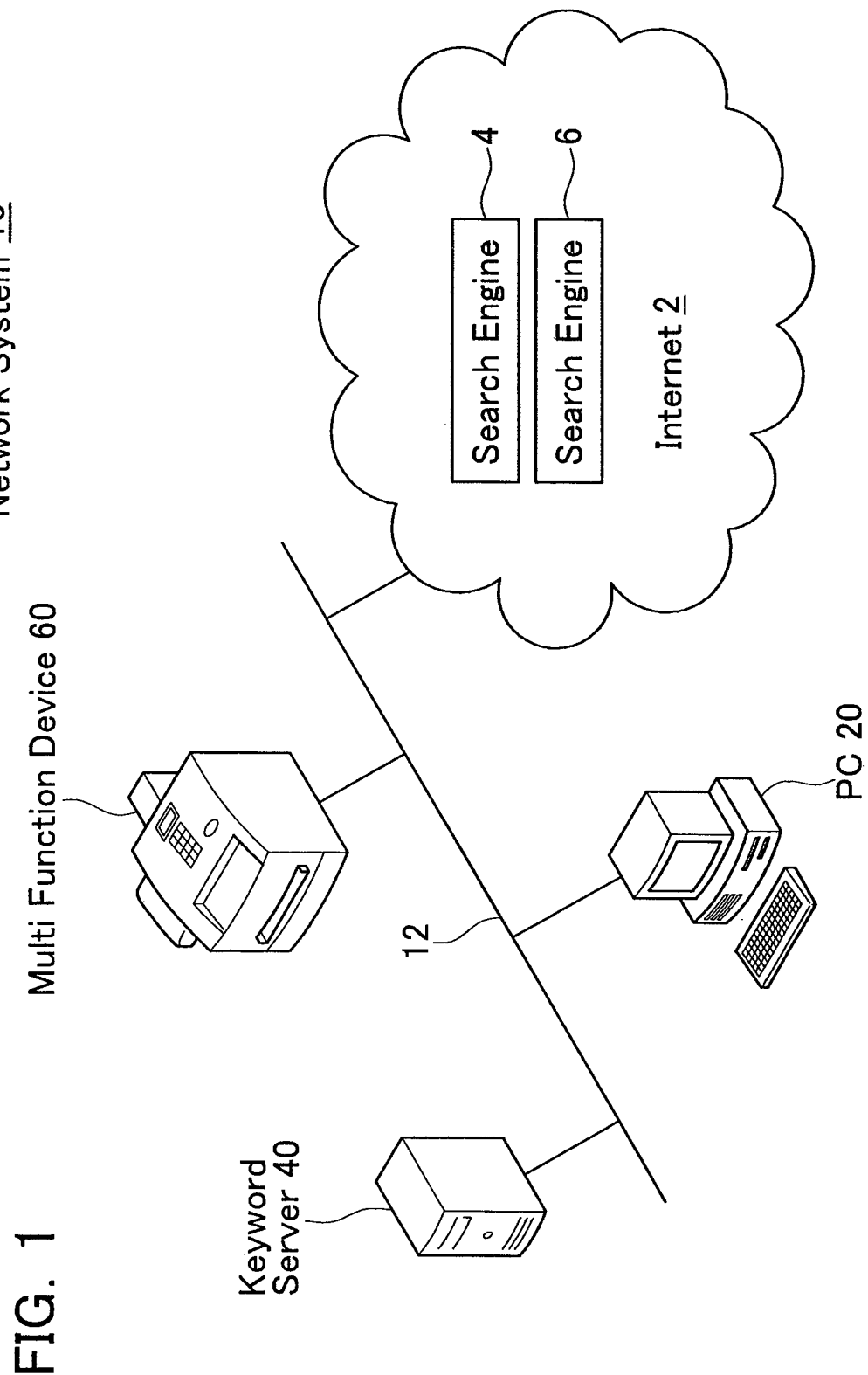
FIG. 1 is an overall view of a network system of a first embodiment.

FIG. 1 shows in simplified form the construction of a network system 10 of a first embodiment. The network system 10 includes a PC 20, a keyword server 40, a multi function device 60, Internet 2, etc. The PC 20, the network server 40, and the multi function device 60 are composed to be separate from one another. The PC 20, the keyword server 40, and the multi function device 60 are connected to a LAN or WAN via a HUB, router, etc. The PC 20, the keyword server 40, and the multi function device 60 are capable of communicating with one another. A plurality of search engines 4, 6, etc., exist on the Internet 2.

(Construction of the PC)

Figure 2:
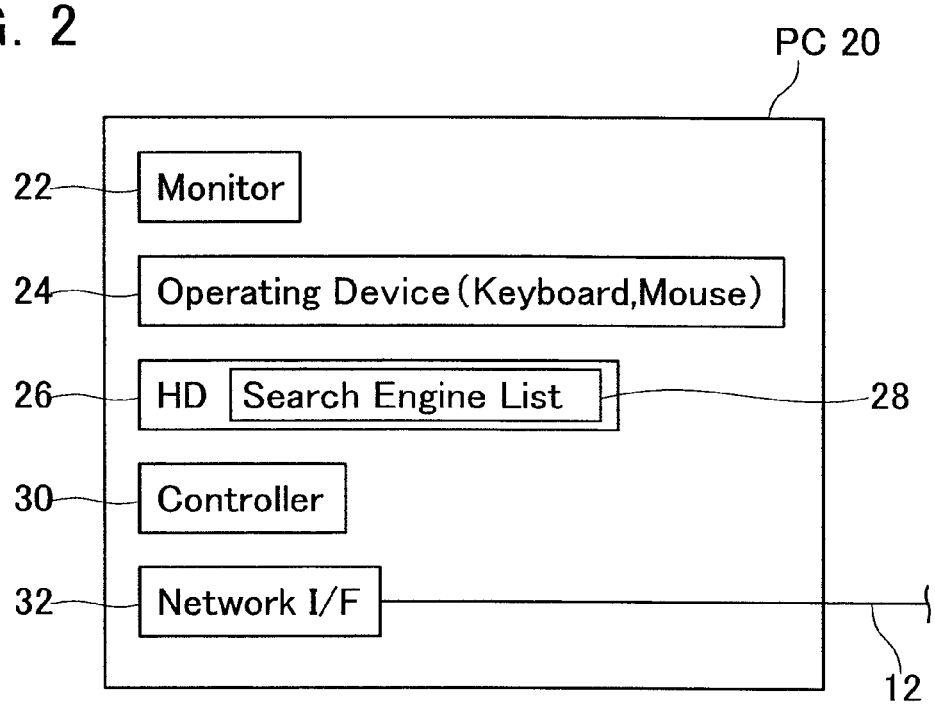
FIG. 2 shows the construction of a PC of the first embodiment.

FIG. 2 shows the construction of the PC 20. The PC 20 includes a monitor 22, an operating device 24, a hard disk (HD) 26, a controller 30, and a network interface (network I/F) 32. The monitor 22 can display various data. The operating device 24 includes a keyboard and a mouse that are operated by a user. The user can input various data and commands into the PC 20 by operating the operating device 24. The HD 26 can store various data. The HD 26 of the present embodiment can store a search engine list 28. The search engine list 28 includes the URLs (Uniform Resource Locator) of the search engines 4, 6, etc. The search engine list 28 is set by a user. The controller 30 is capable of executing various processes in accordance with a preset program, and performing overall control of the operation of the PC 20. The processes executed by the controller 30 are described in detail below. A network cable 12 is connected to the network I/F 32. As shown in FIG. 1, the network cable 12 is connected to the Internet 2 via a HUB, router, etc. The. The PC 20 is capable of executing Internet communications via the network I/F 32. In addition, the network cable 12 is connected to the network server 40 via a HUB, router, etc. The PC 20 can communicate with the keyword server 40 via the network I/F 32.

(Construction of the Keyword Server)

Figure 3:
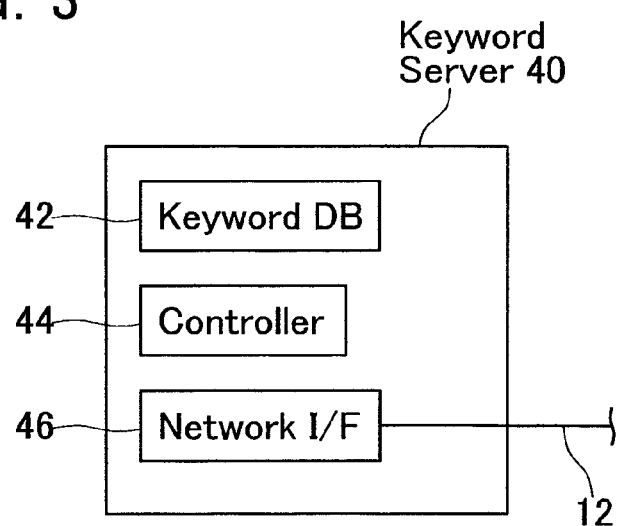
FIG. 3 shows the construction of a keyword server of the first embodiment.
Figures 4, 5:
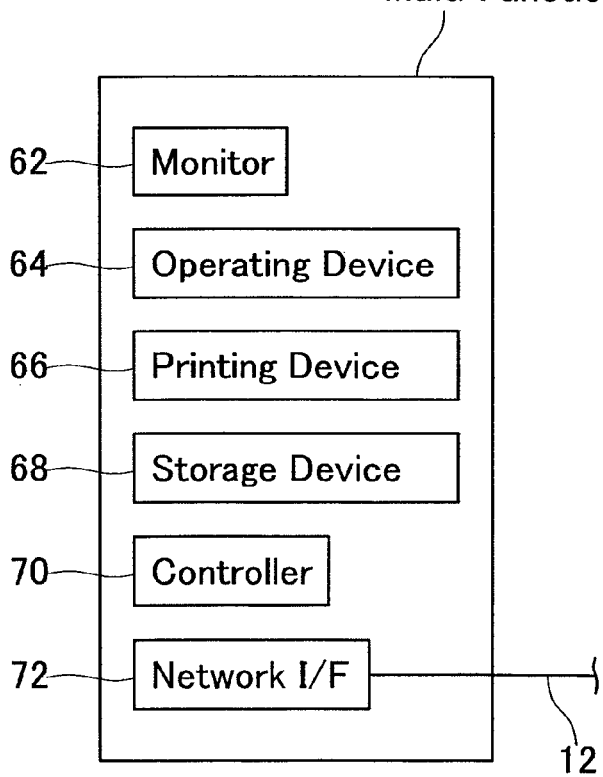
FIG. 4 shows an example of the stored content of a keyword database of the first embodiment.
FIG. 5 shows the construction of a multi function device of the first embodiment.

FIG. 3 shows the construction of the keyword server 40. The keyword server 40 includes a keyword database (keyword. DB) 42, a controller 44, and a network interface (network I/F) 46. FIG. 4 shows an example of the storage content of the keyword DB 42. The keyword DB 42 can combine and store a type of search engine 50 with a keyword 52. The type of search engine 50 is set by the URL of the search engine. A method for storing information in the keyword DB 42 is described in detail below. The controller 44 is capable of executing various processes in accordance with a preset program, and performing overall control of the operation of the keyword server 40. The processes executed by the controller 44 are described in detail below. The network cable 12 is connected to the network I/F 46. As shown in FIG. 1, the network cable 12 is connected to the PC 20 via a HUB, router, etc. The keyword server 40 can communicate with the PC 20 via the network I/F 46. In addition, the network cable 12 is connected to the multi function device 60 via a HUB, router, etc. The keyword server 40 can communicate with the multi function device 60 via the network I/F 46.

(Construction of the Multi Function Device)

FIG. 5 shows the construction of the multi function device 60. The multi function device 60 includes a monitor 62, an operating device 64, a printing device 66, a storage device 68, a controller 70, and a network interface (network I/F) 72. The monitor 62 can display various data. The operating device 64 includes a plurality of keys (numeric keys, a start key, a cancel key, a search button, etc.) that are operated by a user. The operating device 64 does not include a keyboard or mouse. The user can input various data and commands into the multi function device 60 by operating the operating device 64. The printing device 60 can print onto print media based upon print data. The print data may be sent from outside the multi function device 60 (e.g., Internet 2). In addition, the print data may be produced by a scanner (not shown in the drawings) that forms a portion of the multi function device 60. The storage device 68 can store various data. The content of the information stored in the storage device 68 is described below as needed. The controller 70 is capable of executing various processes in accordance with a preset program, and performing overall control of the operation of the multi function device 60. The processes executed by the controller 70 are described in detail below. The network cable 12 is connected to the network I/F 72. As shown in FIG. 1, the network cable 12 is connected to the keyword server 40 via a HUB, router, etc. The multi function device 60 can communicate with the keyword server 40 via the network I/F 72. In addition, the network cable 12 is connected to the Internet 2 via a HUB, router, etc. The multi function device 60 is capable of executing Internet communications via the network I/F 72.

(Overview of the Processes for Each Device)

Figure 6:
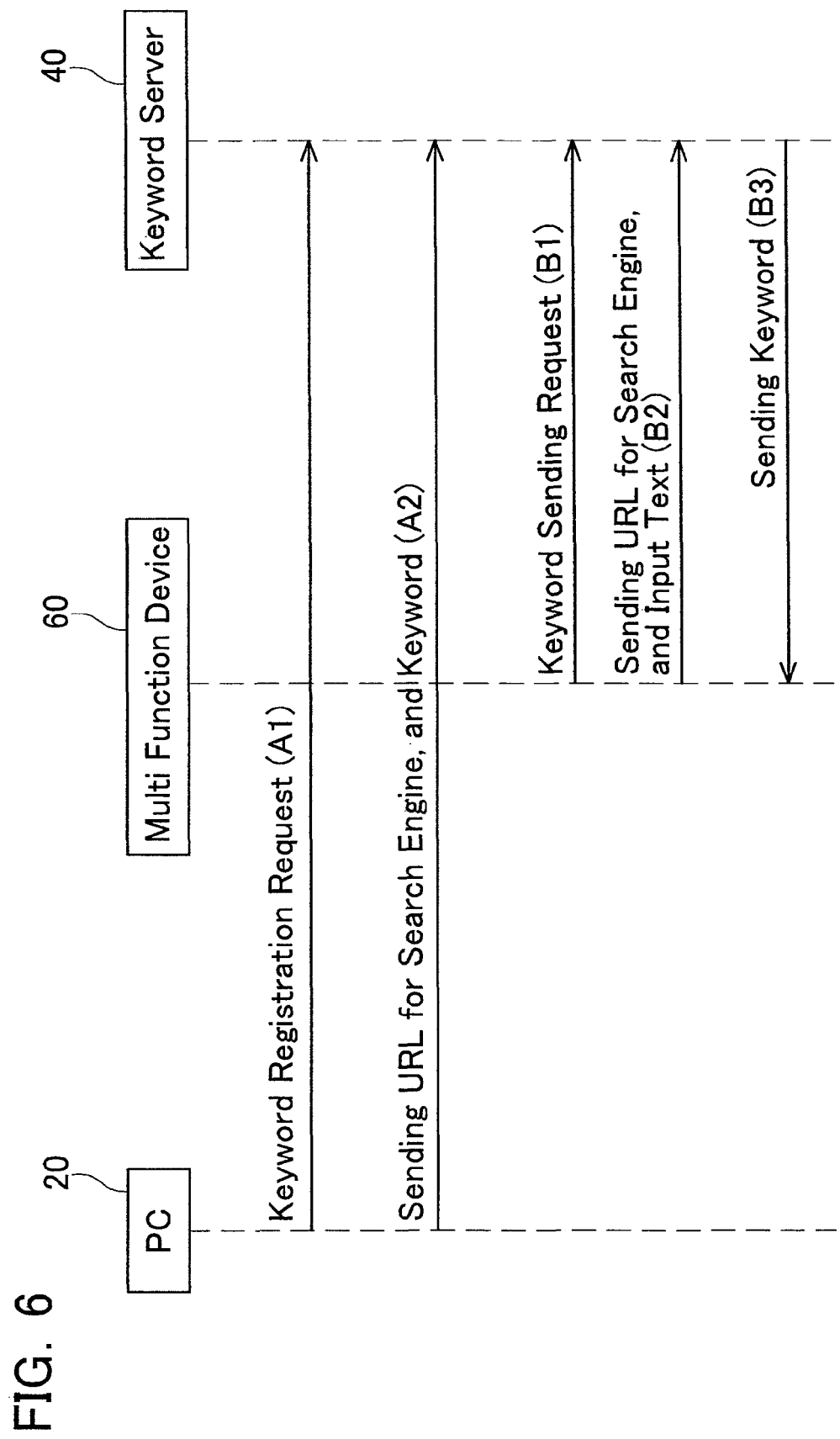
FIG. 6 shows a time chart of the processes executed by each device of the first embodiment.

Next, an overview of the processes executed by each of the devices 20, 40, 60 is described. FIG. 6 shows a time chart of the processes executed by each device 20, 40 and 60. The user can select a search engine (e.g., the search engine 4 (see FIG. 1)) by operating the operating device 24 of the PC 20 (see FIG. 2). In addition, the user can input a desired keyword into the PC 20. The PC 20 can execute a search process. In the search process, the keyword input by the user is sent to the selected search engine and a search result is acquired. The PC 20 sends a keyword registration request (A1) to the keyword server 40 when the search process is executed. Next, the PC 20 sends a URL for the search engine and the keyword used by the search process to the keyword server 40 (A2). The keyword server 40 can store a combination of the URL for the search engine and the keyword in the keyword DB 42 (see FIG. 4).

A user can select a URL for a search engine by operating the operating device 64 of the multi function device 60 (see FIG. 5). Furthermore, the user can input the first portion of the text (at least one letter) of the desired keyword into the multi function device 60. The multi function device 60 sends a keyword sending request (B1) to the keyword server 40 in a case where text has been input. Next, the multi function device 60 sends the selected URL and the input text to the keyword server 40 (B2). The keyword server 40 identifies keywords by searching the keyword DB 42 using the URL and text sent from the multi function device 60. The keyword server 40 sends the identified keywords to the multi function device 60 (B3). The multi function device 60 can display the keywords sent from the keyword server 40. The user can select one keyword from the displayed keywords by operating the operating device 64. In this case, the multi function device 60 can execute a search process that sends the keyword selected by the user to the selected search engine and acquires a search result.

(Process of the PC)

Figure 7:
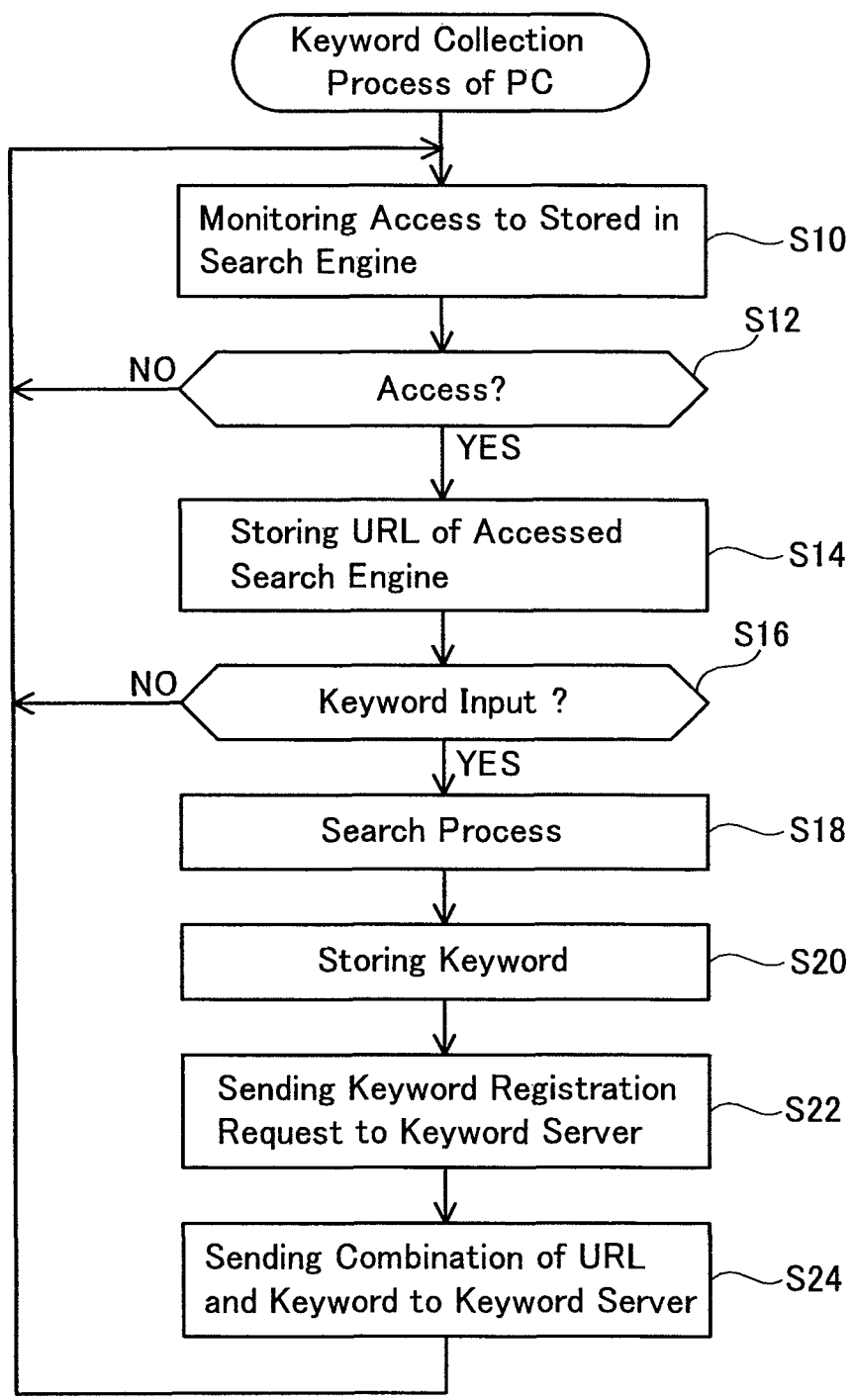
FIG. 7 shows a flowchart of a keyword collection process of the PC of the first embodiment.

Next, the process executed by the PC 20 is described in detail. FIG. 7 shows a flowchart of the keyword collection process of the PC 20. As noted above, the HD 26 of the PC 20 stores the search engine list 28 (see FIG. 2). The search engine list 28 includes a plurality of URLs for search engines. The user can access any search engine on the Internet 2 by operating the operating device 24. The controller 30 of the PC 20 monitors whether a user accesses any URL stored in the search engine list 28 (S10). In a case where any URL is accessed by the user, the controller 30 determines the answer is YES in S12. In this case, the controller 30 temporarily stores the accessed URL on the HD 26 (S14).

The user can input a desired keyword by operating the operating device 24. The controller 30 monitors inputting of the keyword by the user (S16). In a case where access to the search engine has been completed without inputting a keyword, the controller 30 determines the answer is NO in S16. In this case, the controller 30 returns to S10 and monitors access to the search engine. However, in a case where a keyword has been input, the controller 30 determines the answer is YES in S16. In this case, the controller 30 executes a search process that sends the input keyword to the search engine being accessed and acquires a search result (S18). Although not illustrated in the flowchart, the controller 30 can display the search result acquired with the search process of S18 on the monitor 22 (see FIG. 2).

The controller 30 temporarily stores the keyword used by the search process on the HD 26 (S20). Next, the controller 30 sends a keyword registration request to the keyword server 40 (S22 (see A1 of FIG. 6)). The controller 30 then sends the URL stored on the HD 26 in S14 and the keyword stored on the HD 26 in S20 to the keyword server 40 (S24 (see A2 of FIG. 6)). After the process described above, the keyword collection process is complete.

(Processes of the Keyword Server)
(Main Process)

Figure 8:
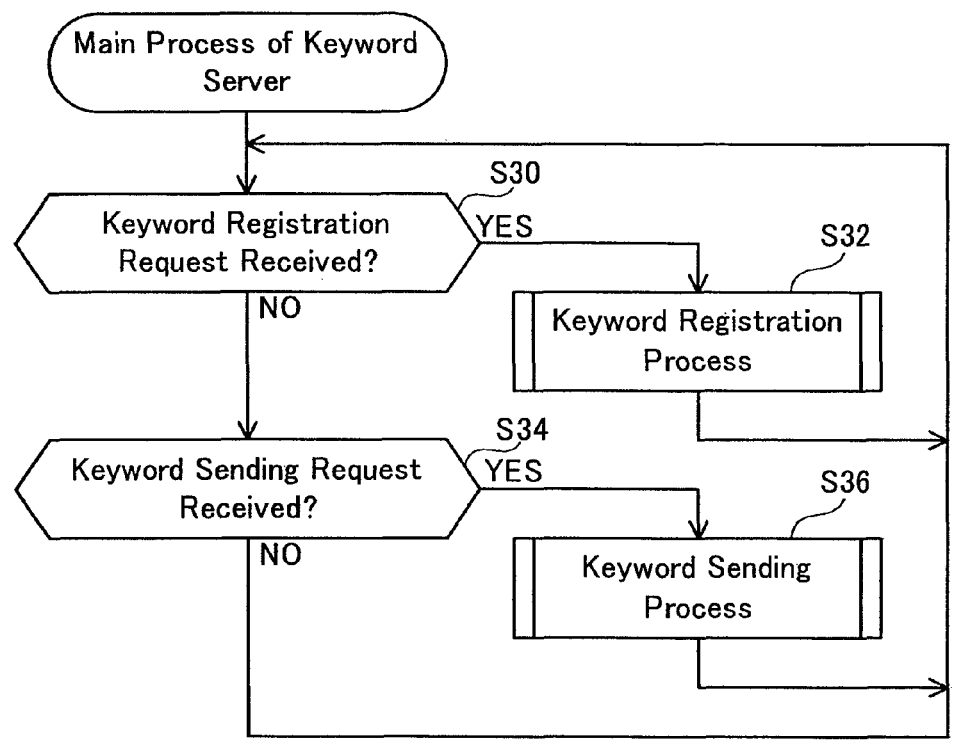
FIG. 8 shows a flowchart of a main process of the keyword server of the first embodiment.

The processes executed by the keyword server 40 are described in detail. FIG. 8 shows a flowchart of the main process of the keyword server 40. The controller 44 of the keyword server 40 (see FIG. 3) monitors whether the keyword registration request sent from the PC 20 (see A1 of FIG. 6, S22 of FIG. 7) has been received (S30). In a case where the keyword registration request has been received (YES in S30), the controller 44 executes the keyword registration process (S32). The keyword registration process is described in detail below. Furthermore, the controller 44 also monitors whether the keyword sending request sent from the multi function device 60 (see B1 of FIG. 6, S106 of FIG. 12 described below) has been received (S34). In a case where the keyword sending request has been received (YES in S34), the controller 44 executes the keyword sending process (S36). The keyword sending process is described in detail below.

(Keyword Registration Process)

Figure 9:
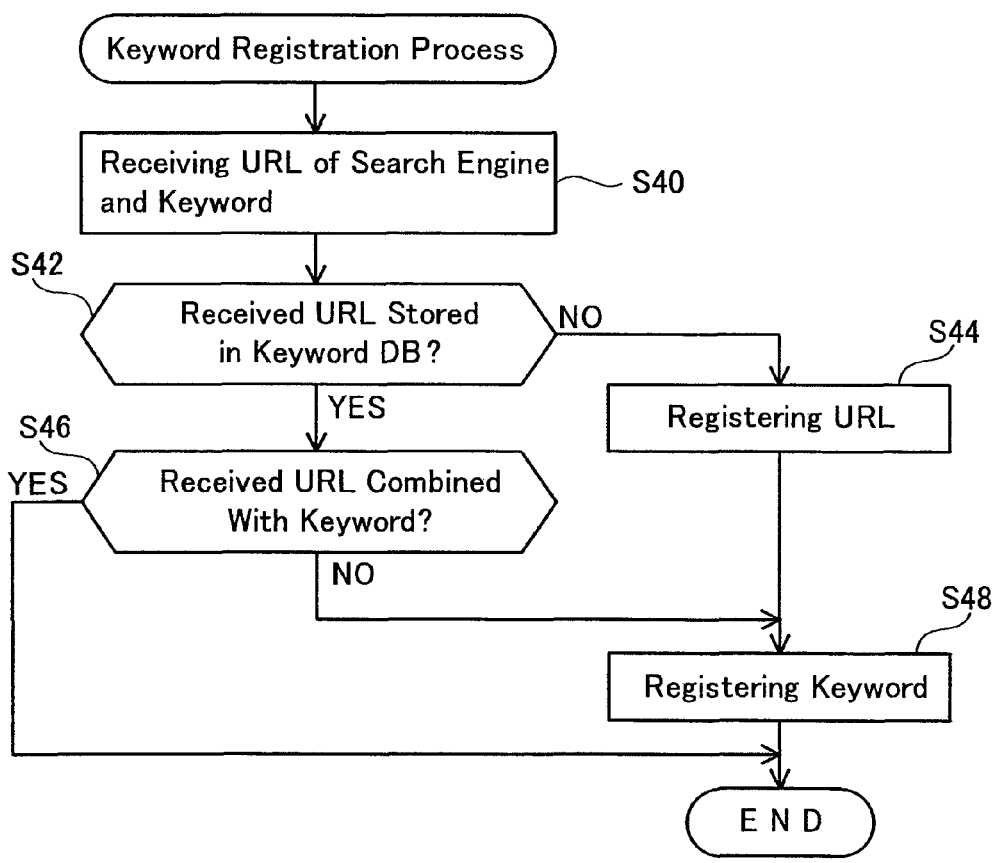
FIG. 9 shows a flowchart of a keyword registration process of the keyword server of the first embodiment.

FIG. 9 shows a flowchart of the keyword registration process of S32 in FIG. 8. The controller 44 receives the URL for the search engine and the keyword sent from the PC 20 (see A2 of FIG. 6, S24 of FIG. 7) (S40). The controller 44 confirms whether the URL received in S40 is stored in the keyword DB 42 (see FIG. 3) (S42). In the case where the URL is not stored in the keyword DB 42 (NO in S42), the controller 44 stores the URL in the keyword DB 42 (S44). When S44 is complete, the controller 44 executes S48. However, in the case where the URL has been stored in the keyword DB 42 (YES in S42), the controller 44 confirms whether the keyword received in S40 is combined with the URL received S40 in the keyword DB 42 (S46). In a case where the keyword is combined with the URL in the keyword DB 42 (YES in S46), the keyword registration process is complete. However, in a case where the keyword is not combined with the URL in the keyword DB 42 (NO in S46), the controller 44 executes S48.

In S48, the controller 44 combines the keyword received in S40 with the URL received in S40 and stores a combination of the keyword and the URL in the keyword DB 42. For example, in a case where. S48 is to be executed via S44, the controller 44 combines the keyword received in S40 with the URL stored in S44. However, in a case where S48 is to be executed via S46, the controller 44 combines the keyword received in S40 with the URL stored before in the keyword DB 42 (the URL for the search engine received in S40). When S48 is finished, the keyword registration process is complete.

(Keyword Sending Process)

Figure 10:
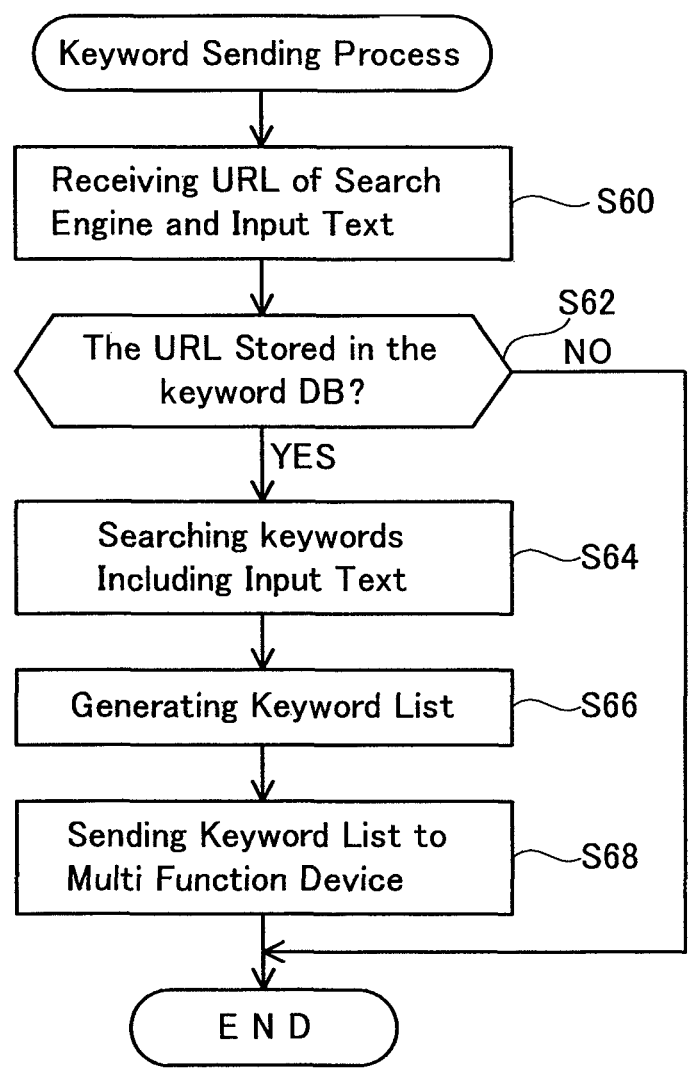
FIG. 10 shows a flowchart of a keyword sending process of the keyword server of the first embodiment.

FIG. 10 shows a flowchart of the keyword sending process of S36 in FIG. 8. The controller 44 receives the. URL for the search engine and the text sent from the multi function device 60 (see B2 of FIG. 6, S108 of FIG. 12 described below) (S60). The controller 44 confirms whether the URL received in S60 is in the keyword DB 42 (S62). In a case where the URL is not stored in the keyword DB 42 (NO in S62), the keyword sending process is complete. However, in a case where the URL is stored in the keyword DB 42 (YES in S62), the controller 44 identifies the keywords combined with the URL and the included text received in S60 by searching the keyword DB 42 using the URL for the search engine and the text received in S60 (S64). In S64, the controller 44 identifies the keywords that match the first portion of the text received in S60. For example, in a case where the text received in S60 is "a", the controller identifies the keywords that begin with "a".

Next, the controller 44 generates a keyword list that includes keywords identified in S64 (S66). For example, the controller 44 converts the keywords identified in S64 into a data format that is readable in the multi function device 60. In addition, for example, in a case where the number of keywords identified in S64 exceeds a predetermined number, the controller 44 may generate the keyword list including the predetermined number of keywords only. Next, the controller 44 sends the keyword list (keywords) generated in S66 to the multi function device 60 (S68 (see B3 of FIG. 6)). In this way, the keyword sending process is complete.

(Processes of the Multi Function Device)
(Main Process)

Figure 11:
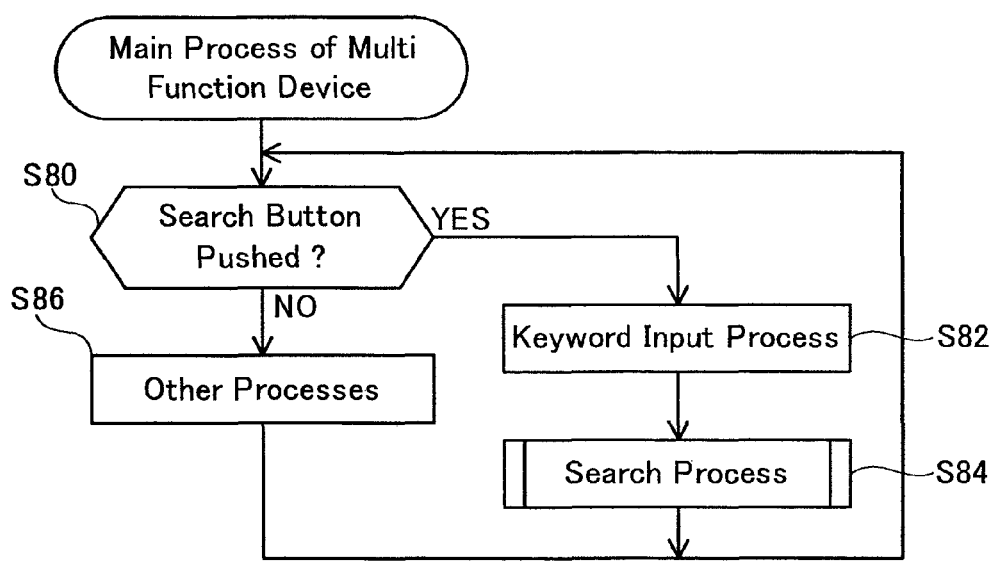
FIG. 11 shows a flowchart of a main process of the multi function device of the first embodiment.

The processes executed by the multi function device 60 are described in detail. FIG. 11 shows a flowchart of the main process executed by the multi function device 60. The operating device 64 (see FIG. 5) of the multi function device 60 includes a search button. A user can operate the search button. The controller 70 of the multi function device 60 (see FIG. 5) monitors whether the search button has been pushed (S80). In a case where the button has been pushed (YES in S80), the controller 70 executes the keyword input process (S82) and the search process (S84). These processes are described in detail below. However, in a case where a key other than the search button has been operated (NO in S80), the controller 70 determines the answer is NO in S80. In this case, the controller 70 executes other processes in response to the type of key that was operated (S86).

(Keyword Input Process)

Figure 12:
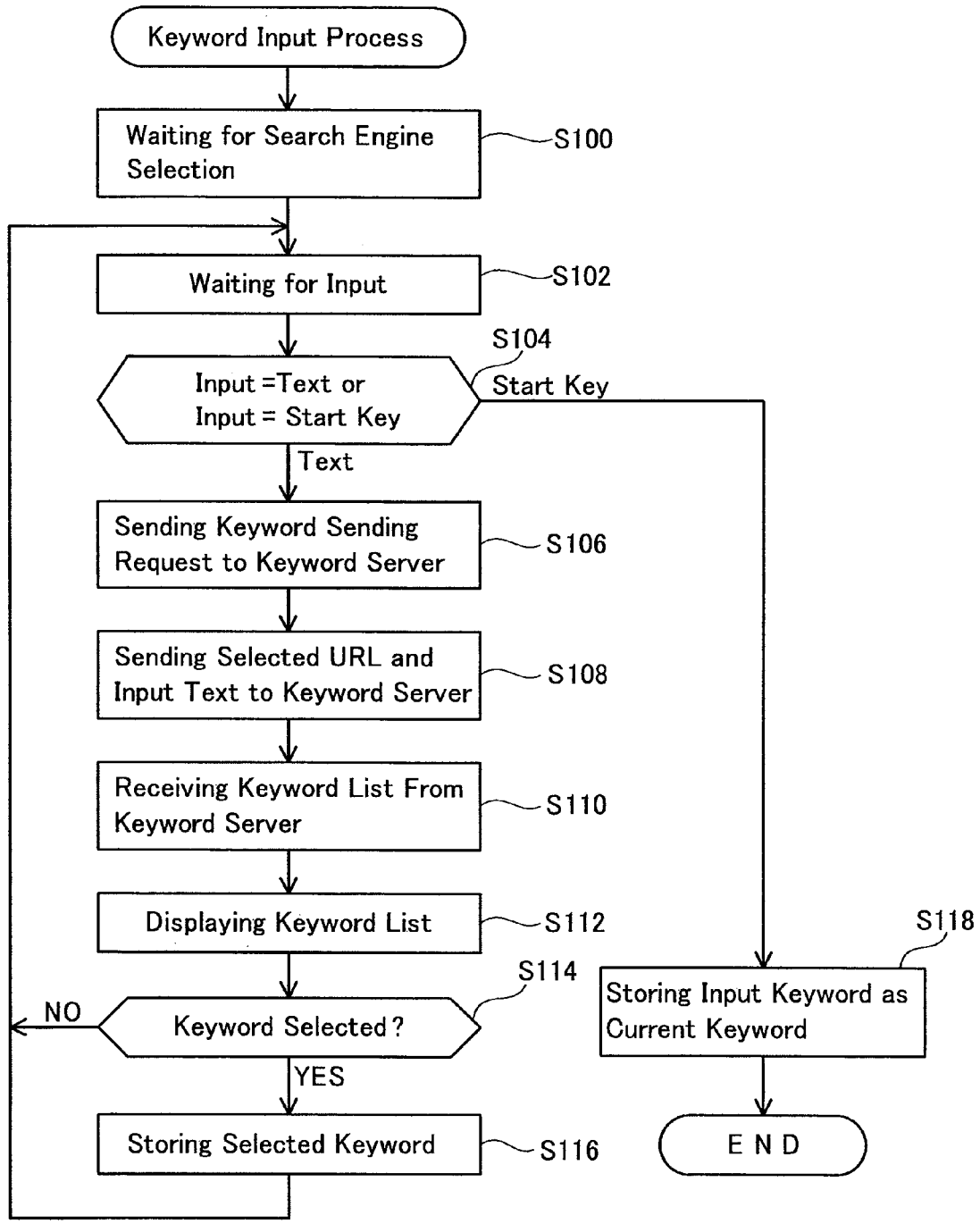
FIG. 12 shows a flowchart of a keyword input process of the multi function device of the first embodiment.
Figure 14:
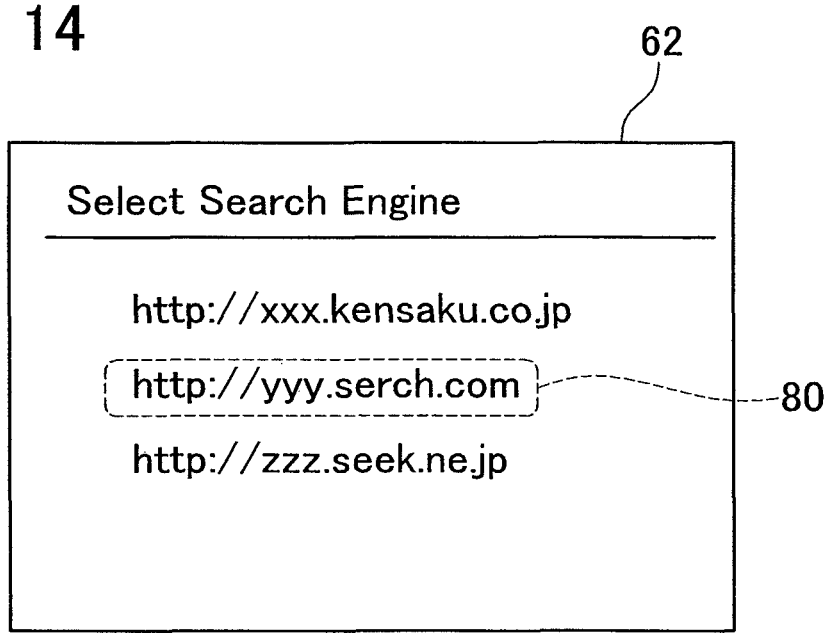
FIG. 14 shows an example of a screen of a monitor of the multi function device for selecting a search engine of the first embodiment.

FIG. 12 shows a flowchart of the keyword input process of S82 in FIG. 11. Where the search button is operated in S80, the controller 70 makes the monitor 62 display the list of search engines (see FIG. 5). FIG. 14 shows a screen example of the list of search engines. Note that although the URL for each search engine is displayed in. FIG. 14, the name of each search engine may instead be displayed. A user can move the cursor 80 up and down by operating the operating device 64. The user can select one search engine. The controller 70 waits until a search engine is selected by the user (S100). When a search engine is selected, the controller 70 displays the image illustrated in FIG. 15 on the monitor 62. A user can input the first portion of text of a desired keyword by operating the operating device 64 (e.g., the numeric keys). The controller 70 waits until text is input by the user (or waits until the start key described below is operated) (S102). When text is input by the user, the controller 70 determines that text was input in S104. In this case, the flow proceeds to S106.

Figure 15:
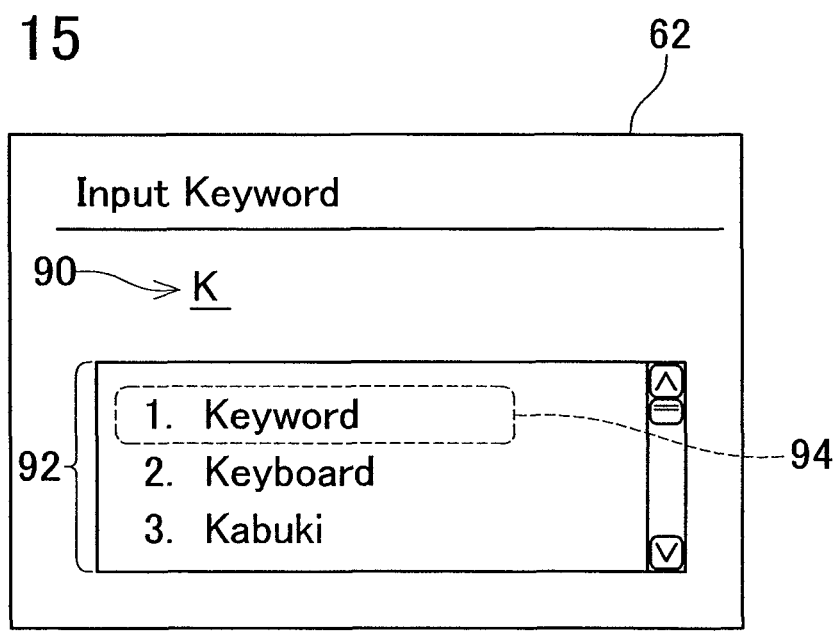
FIG. 15 shows an example of a screen of the monitor for inputting a keyword of the first embodiment.

In S106, the controller 70 sends a keyword sending request to the keyword server 40 (see B1 of FIG. 6). Next, the controller 70 sends the search engine selected in S100 and the text input in S102 to the keyword server 40 (S108 (see B2 of FIG. 6)). This results in the keyword list from the keyword server 40 (S68 of FIG. 10) being sent to the multi function device 60. The multi function device 60 receives the keyword list (S110). The controller 70 displays keyword candidate data included in the keyword list sent in S110 on the monitor 62. An example of the keyword candidate data 92 in which "k" was input in S102 is shown in FIG. 15. The user can move the cursor 94 up and down by operating the operating device 64. The user can select one keyword. In a case where no keyword is selected by the user, the controller 70 determines that the answer in S114 is NO. In this case, the controller 70 returns to S102 and monitors the input of the user. The user can input text that continues after "k" by operating the operating device 64. For example, the user can input "ke". In this case, the controller 70 sends the two letter text "ke" in S108 to the keyword server 40. The multi function device 60 receives the new keyword candidate data sent from the keyword server 40 (the keywords that include the two letters of text "ke") (S110), and displays this new keyword candidate data (S112).

Figure 16:
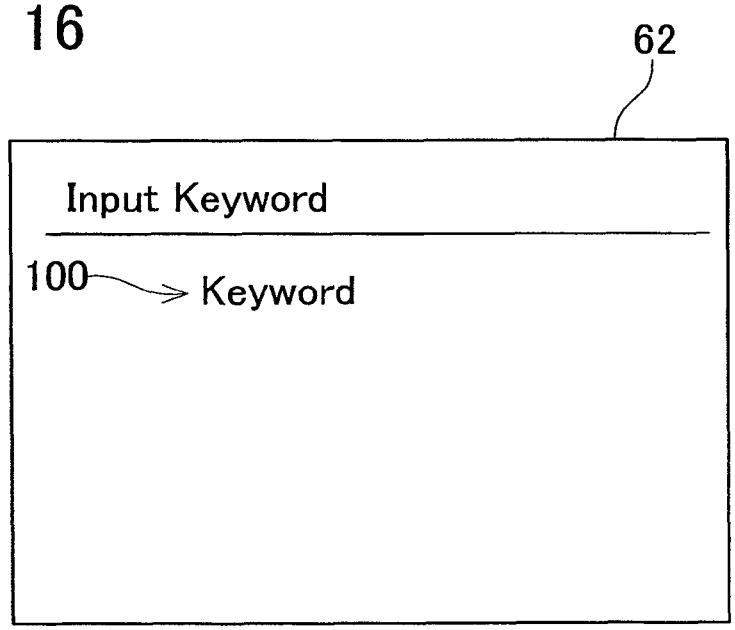
FIG. 16 shows an example of a screen of the monitor of the first embodiment displaying an input keyword.

However, in a case where one keyword was selected by the user in S114, the flow proceeds to S116. In S116, the controller 70 temporarily stores the selected keyword in the storage device 68 (see FIG. 5). FIG. 16 shows a screen example in which a keyword has been selected. A user can identify the keyword 100 that the user selected (input) by viewing this display. In this state, a user can operate the start key of the operating device 64. In this case, the controller 70 determines that the answer is YES in S104 and proceeds to S118. In S118, the controller 70 stores the keyword that was input by the user (the keyword that was stored in S116) as the current keyword. In this way, the keyword input process is complete.

(Search Process)

Figure 13:
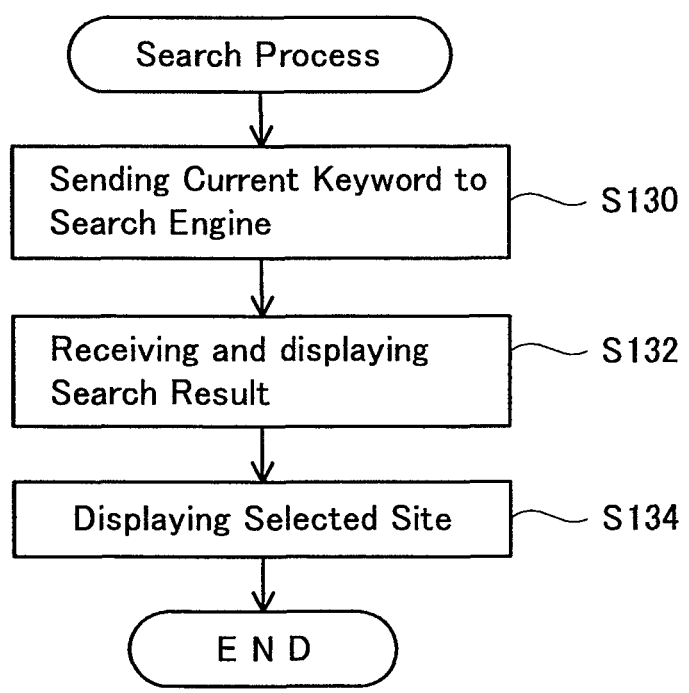
FIG. 13 shows a flowchart of a search process of the multi function device of the first embodiment.
Figure 17:
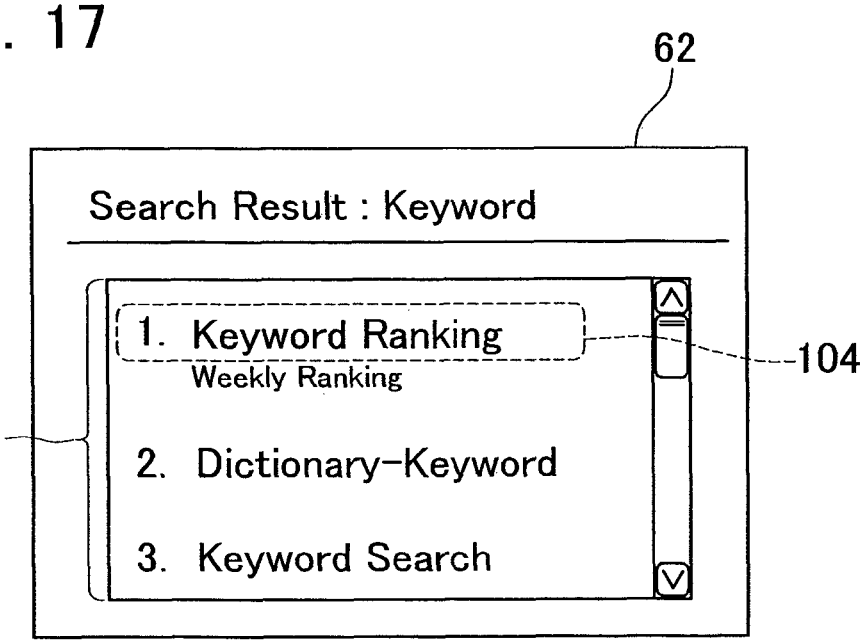
FIG. 17 shows an example of a screen of the monitor of the first embodiment displaying search results.

FIG. 13 shows a flowchart of the search process of S84 in. FIG. 11. The search process continues to be executed in S118 of FIG. 12. The controller 70 sends the current keyword stored in S118 to the search engine selected in S100 of FIG. 12 (S130). The controller 70 acquires and displays the search result of the search engine (S132). FIG. 17 shows a screen example of the search result. FIG. 17 shows the search result for the current keyword "keyword". A list 102 of a plurality of sites that include the keyword "keyword" is displayed on the monitor 62. Although not illustrated in the flowchart of FIG. 13, a user can print the list 102 by operating the start key of the operating device 64. In this case, the user can view the list 102 printed on print media. Furthermore, a user can move the cursor 104 up and down by operating the operating device 64. The user can select one site. In this case, the controller 70 displays the selected site (S134). Although not illustrated in the flowchart, a user can print the selected site by operating the start key of the operating device 64. Note that when one site is selected by the user, the controller 70 may automatically print the site. When the site is displayed (or printed) in S134, the search process is complete.

The network system 10 of the first embodiment has been described in detail. In this system 10, the keywords used for search processes of PC 20 are stored in the keyword server 40. A user can input text that forms a desired keyword into the multi function device 60. A keyword that matches the first portion of this text is identified by the keyword server 40. The multi function device 60 can execute the search process for the keyword identified by the keyword server 40. The user can use the keyword used for the search process of PC 20 for the search process of the multi function device 60 without inputting all of the text that forms that keyword. This system 10 can assist a user with the task of inputting a keyword into the multi function device 60. Because of this, a user can reduce the burden of inputting a keyword into a device that does not have a keyboard, such as the multi function device 60. The keyword server 40 not only identifies the keywords that match the first portion of the text sent from the multi function device 60, but may also identify all of the keywords that include that text. For example, in a case where the text "k" was sent from the multi function device 60, the keywords that include a "k" therein, and not just a "k" at the beginning thereof (e.g., "basketball") may be identified.

Furthermore, a user can use a desired search engine to search with the multi function device 60, and thus is extremely useful for the user. In particular, the keyword server 40 stores a combination of the type of search engine that executed the search process and the keyword in the PC 20. The keyword server 40 can generate a keyword list from the keywords that are combined with the type of search engine selected with the multi function device 60. According to this system 10, keywords can be extracted in accordance with the type of search engine selected with the multi function device 60.

This construction is particularly useful when a user uses a different search engine in response to the keyword. For example, in a case where a keyword "XYZ" from engineering vocabulary is used for a search process, a first search engine is used and in a case where a keyword "XXX" from economics vocabulary is used for a search process, a second search engine is used. In this case, the keyword server 40 stores a combination of the keyword "XYZ" and the first search engine, and a combination of the keyword "XXX" and the second search engine. When a user uses the multi function device 60 to search for the keyword "XYZ", the user can select the first search engine, and can input the letter "X" that forms that keyword "XYZ". In this case, the keyword server 40 cane identify the keyword "XYZ" by searching the keyword DB by using the selected first search engine and the input letter "X". In this case, the keyword "XXX" combined with the second search engine is not identified. According to this construction, keyword candidates can be extracted in accordance with the type of search engine selected by the user. A user can be greatly assisted with the task of inputting a keyword into the multi function device 60.

In a case where a user inputs text into the multi function device 60, the multi function device 60 sends the input text to the keyword server 40. The keyword server 40 generates a keyword list that includes a plurality of keyword candidate data, and sends this keyword list to the multi function device 60. The multi function device 60 displays the received keyword candidate data on the monitor 62. The user can select a keyword from the displayed keyword candidate data.

(Second Embodiment)

Next, a second embodiment of the present teaching is described. Here, the differences with the first embodiment are described. The present embodiment differs from the first embodiment in the details of the processes of the multi function device 60. In other words, the second embodiment differs in the processes of FIGS. 11 to 13 of the first embodiment. The storage device 68 of the multi function device 60 of the present embodiment (see FIG. 5) can store a flag (ON or OFF), and the URL for the search engine that executed the previous search process (hereinafter referred to as the "previous search engine"). The composition of this data and how it is stored and used is described in detail below.

(Processes of the Multi Function Device)
(Main Process)

Figure 18:
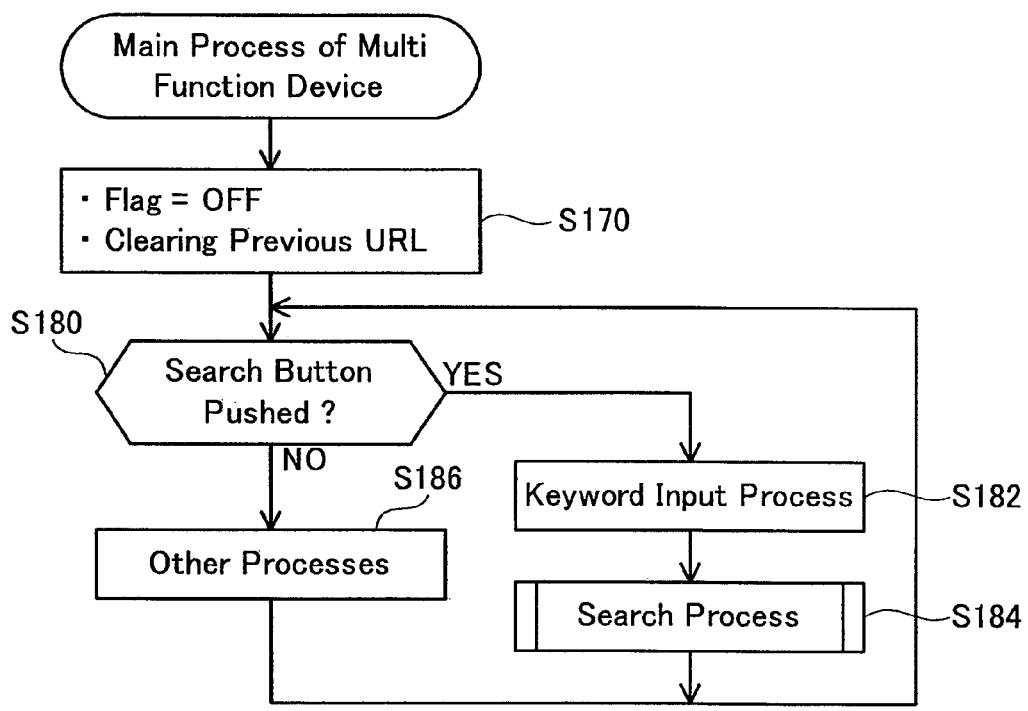
FIG. 18 shows a flowchart of a main process of the multi function device of a second embodiment.

FIG. 18 shows a flowchart of the main process executed by the multi function device 60 of the second embodiment. In a case where the multi function device 60 is turned ON, the controller 70 sets the flag stored in the storage device 68 to OFF, and clears a previous search engine (S170). The controller 70 monitors whether the search button of the operating device 64 has been pushed (S180). In a case where the search button has been pushed (YES in S180), the controller 70 executes the keyword input process (S182) and the search process (S184). In contrast, in a case where a key other than the search button has been operated (NO in S180), the controller 70 determines the answer is NO in S180. In this case, the controller 70 executes other processes in response to the type of key that was operated (S186).

(Keyword Input Process)

Figure 19:
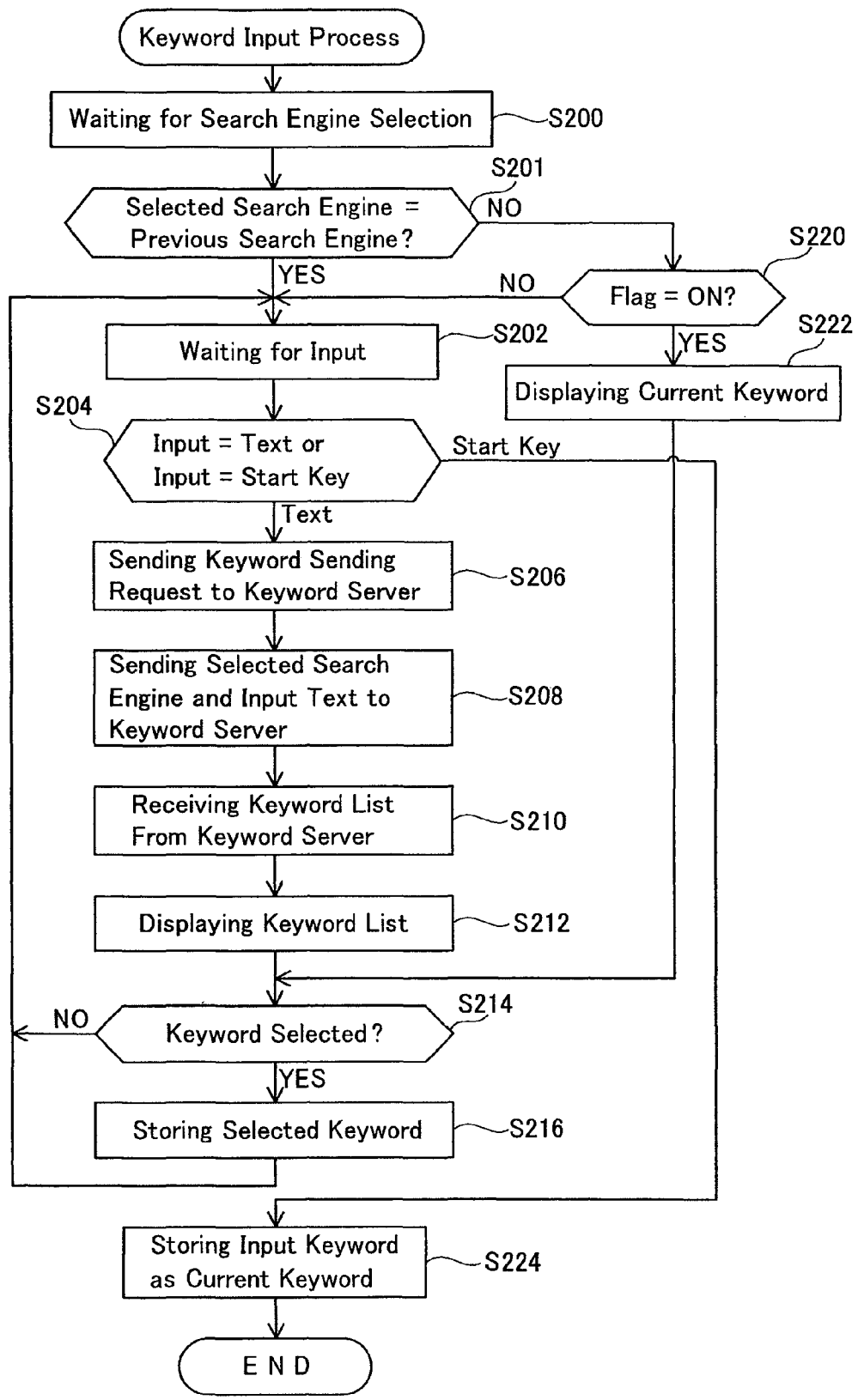
FIG. 19 shows a flowchart of a keyword input process of the multi function device of the second embodiment.

FIG. 19 shows a flowchart of the keyword input process of S182 in FIG. 18. The controller 70 waits until a search engine is selected by the user (S200). In a case where a search engine is selected, the controller 70 confirms whether the selected search engine matches the previous search engine stored in the storage device 68 (S201). In a case where the selected search engine matches the previous search engine (YES in S201), the flow proceeds to S202. The processes from S202 to S216 are identical to the processes from S102 to S116 of FIG. 12 of the first embodiment. Because of this, a description of S202 to S216 is omitted. In addition, the storage of the current keyword when the start key is operated in S204 is also identical to S118 of FIG. 12 of the first embodiment. S230 and S232 of FIG. 20 of execution of the search process for this current keyword are also identical to S130 and S132 of FIG. 13 of the first embodiment.

In a case where the selected search engine does not match the previous search engine (NO in S201), the controller 70 confirms whether the flag stored in the storage device 68 is ON (S220). In a case where the flag is OFF (NO in S220), the flow proceeds to S202. However, in a case where the flag is ON (YES in S220), the controller 70 displays the current keyword stored in the storage device 68 (S222). The keyword displayed here was stored in S224 and was executed in the previous search process (S230, S232 of FIG. 20). When S222 is finished, the flow proceeds to S214. A user can select the current keyword that is displayed (YES in S214), and can operate the start key ("Start key" in S204). In this case, the controller 70 stores the current keyword selected in S214 as a repeat current keyword (S224). This current keyword is used to execute the search process described below.

(Search Process)

Figure 20:
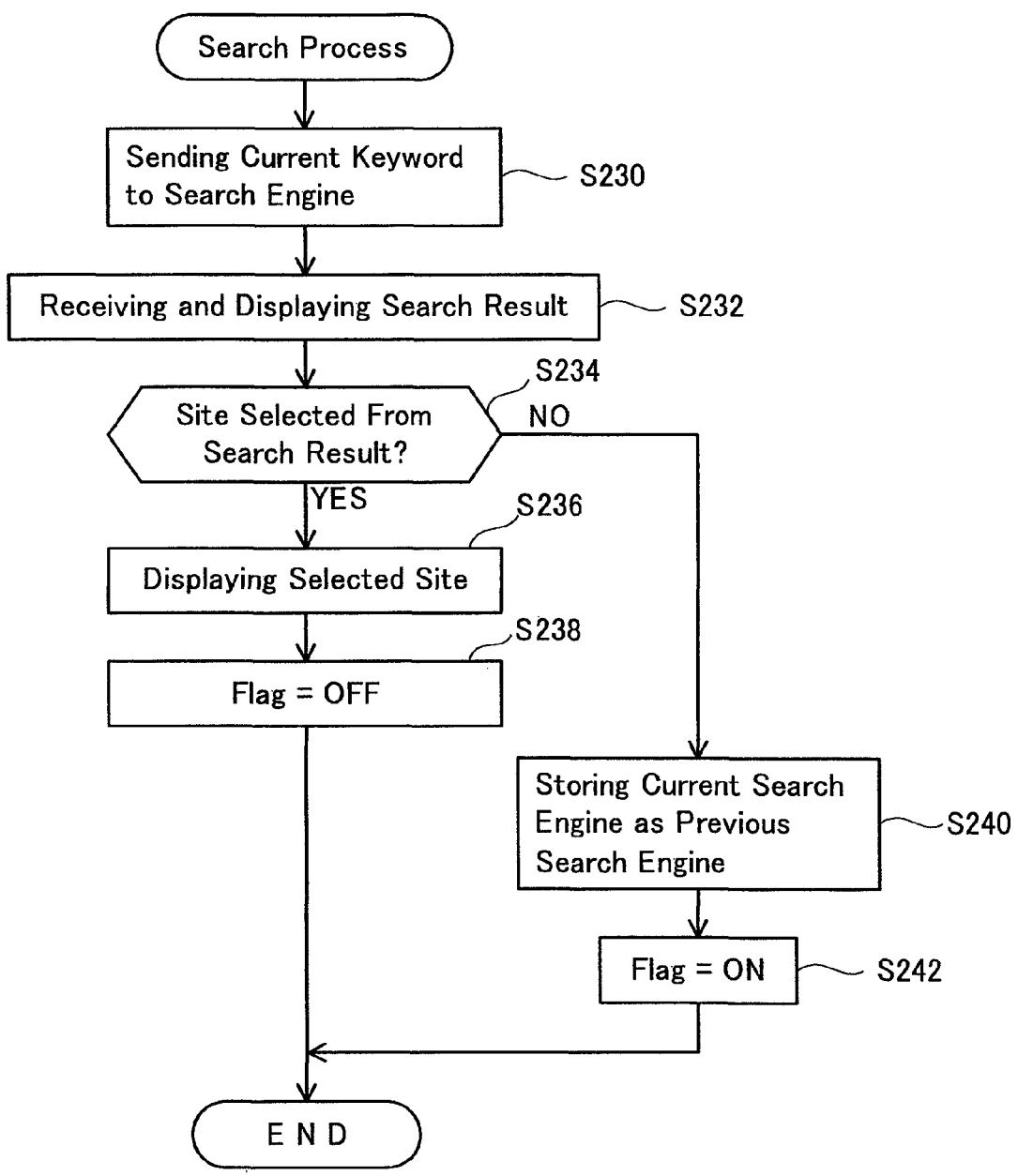
FIG. 20 shows a flowchart of a search process of the multi function device of the second embodiment.

FIG. 20 shows a flowchart of the search process of S184 of FIGS. 18. S230 and S232 are identical to S130 and S132 of FIG. 13 of the first embodiment. In S234, the controller 70 confirms whether one site has been selected by the user from the list of sites displayed in S232. In a case where the user selected from the list of sites (YES in S234), the controller 70 displays (or prints) the selected site (S236). Next, the controller 70 sets the flag stored in the storage device 68 to OFF (S238). However, in a case where the user does not select from the list of sites (NO in S234), the controller 70 stores a URL for the present search engine (the URL for the search engine selected in S200) (S240). In this way, the previous search engine is stored in the storage device 68. Next, the controller 70 sets the flag stored in the storage device 68 to ON (S242). When S238 or S242 are finished, the search process is complete.

For example, the search result acquired when the first search engine is used by the multi function device 60 to search may not be desired by the user. In this case, the user does not select a site from the list of search result sites (NO in S234). In this case, the multi function device 60 stores the URL for the first search engine (the previous search engine) (S240), and sets the flag to ON (S242). In this state, the user can select the second search engine in order to change the search engine and search the same keyword (S200). In this case, it is determined that the answer is NO in S201 of FIG. 19, and determined that the answer is YES in S220 of FIG. 19. In this way, the keyword used in the previous search process (the current keyword) is displayed on the monitor 62 (S222). The user can select the current keyword being displayed (S214). The result is that the multi function device 60 will use the second search engine to execute a search process for the same keyword (S230 and S232). In the present embodiment, the user does not need to re-input the keyword when changing the search engine or performing another search for the same keyword with the multi function device 60. This can greatly ease the burden on the user of inputting a keyword.

Although the first and second embodiments were described in detail above, these are merely illustrations, and do not limit the scope of the patent claims. The technology described in the scope of the patent claims includes various modifications and changes to the specific examples illustrated above. Variant embodiments of the aforementioned embodiments are provided below.

(Variant Embodiment 1)

Figure 21:
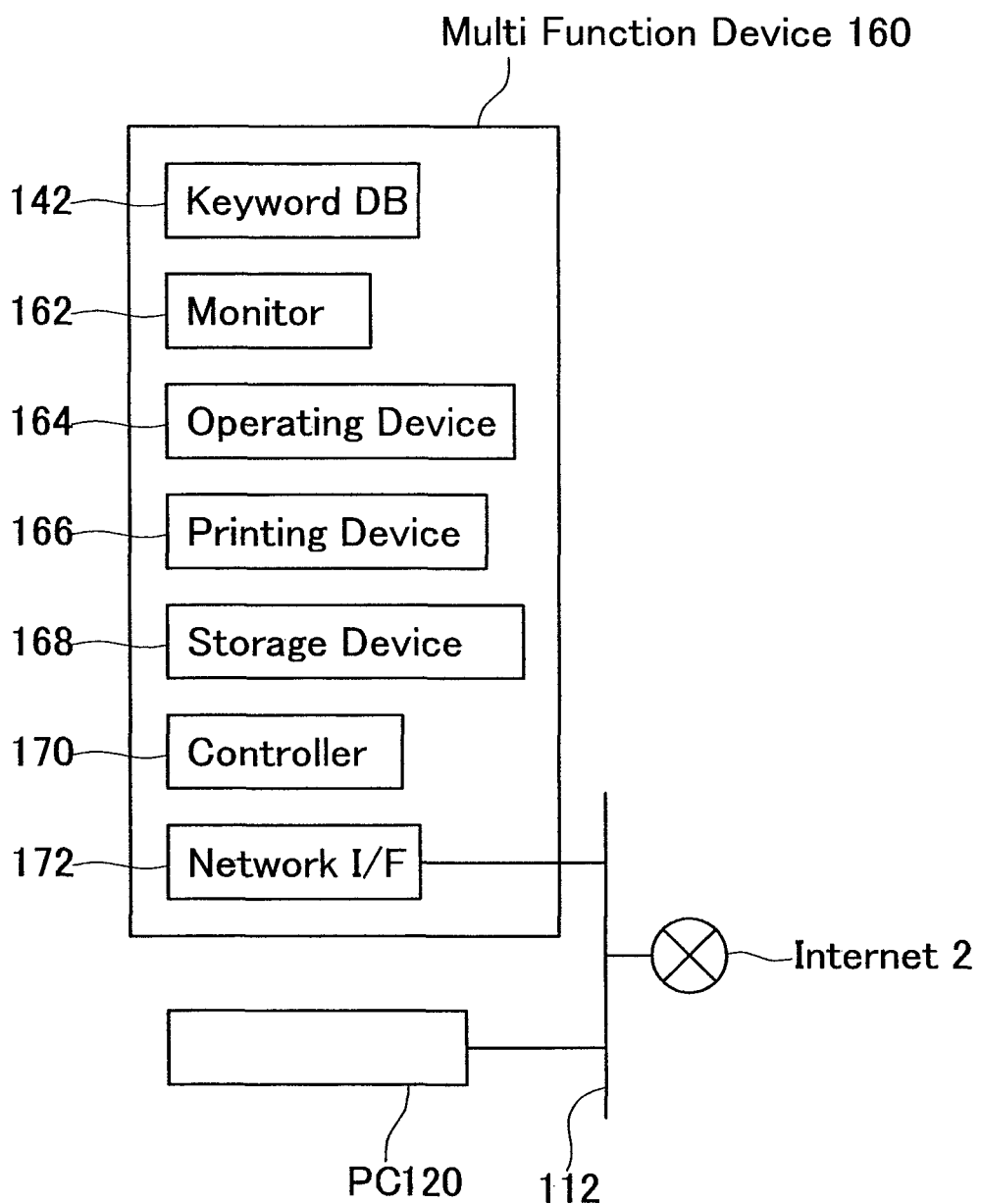
FIG. 21 shows the construction of a multi function device of a variant embodiment 1.

In each of the first and the second embodiments, the keyword server 40 including the keyword DB 42 is constructed separately from the PC 20, and is also constructed separately from the multi function device 60. However, the keyword database may be installed in the multi function device. In this case, the construction of FIG. 21 can be used. In other words, in addition to each device 162, 164, 166, 168, 170, 172 of the same construction as in the first embodiment, the multi function device 160 also includes a keyword database (keyword DB) 142. The multi function device 160 is connected via a network cable 112 to a PC 120 having the same construction as the PC 20 of the first embodiment. In addition, the multi function device 160 is connected to the Internet 2 via the network cable 112. The PC 120 is connected to the Internet 2 via the network cable 112.

The keyword DB 142 stores a combination of a keyword and a search engine that executed the search process in PC 120. The controller 170 can identify the keywords (keyword candidate data) by searching the keyword DB 142 using the search engine selected with the operating device 164 and the input text. The controller 170 displays the keyword candidate data on the display device 162. The user can select one keyword from the keyword candidate data displayed on the display device 162. In this way, the controller 170 can execute a search process that sends the selected keyword to the selected search engine and acquire a search result. In addition, the construction of the present variant embodiment can be used to execute each process of the second embodiment. Each process executed by the PC 120 and the multi function device 160 of the present variant embodiment can be implemented by making slight changes in each flowchart of the aforementioned first embodiment and second embodiment (FIGS. 7-13, FIGS. 18-20).

(Variant Embodiment 2)

The keyword database may be installed in the PC. Each process executed by the PC and the multi function device of the present variant embodiment can be implemented by making slight changes in each flowchart of the aforementioned first embodiment and second embodiment (FIGS. 7-13, FIGS. 18-20). A communication device including this construction can be implemented as follows.

In other words, the communication device is connected with another communication device. The communication device includes an input device, a search device, a keyword database, a keyword identification device, and a keyword sending device. The input device allows the input of a keyword. The search device sends a keyword that was input into the input device to a search engine on the Internet and executes a search process that acquires a search result. The keyword database cumulatively stores keywords that were executed by the search process by the search device. The keyword identification device searches the keyword database using text that was input into the other communication device in order to identify keywords that include the text. The keyword sending device sends the keywords identified by the keyword identification device to the other communication device.

In addition, computer readable media is also useful to implement the aforementioned communication device. The computer readable media includes commands that cause each of the following processes to be executed on a computer that is installed in the communication device.

(1) A search process that sends keywords input into the aforementioned communication device to a search engine on the Internet and acquire a search result.

(2) A keyword storage process that cumulatively stores the keywords used by the search process in a predetermined storage area.

(3) A keyword identification process that searches the storage area using text input into another communication device in order to identify keywords that include that text.

(4) A sending process that sends the keywords identified in the keyword identification process to the other communication device.

(Variant Embodiment 3)

A device other than the PC 20 can be used to construct the system. For example, a multi function device may be used instead of the PC 20 to construct the system. In this case, the system is constructed by two multi function devices and a keyword server. In addition, a device other than the multi function device 60 can be used to construct the system. For example, a PC may be used instead of the multi function device 60 to construct the system. In this case, the system is constructed from two PCs and a keyword server.

(Third Embodiment)

Figure 22:
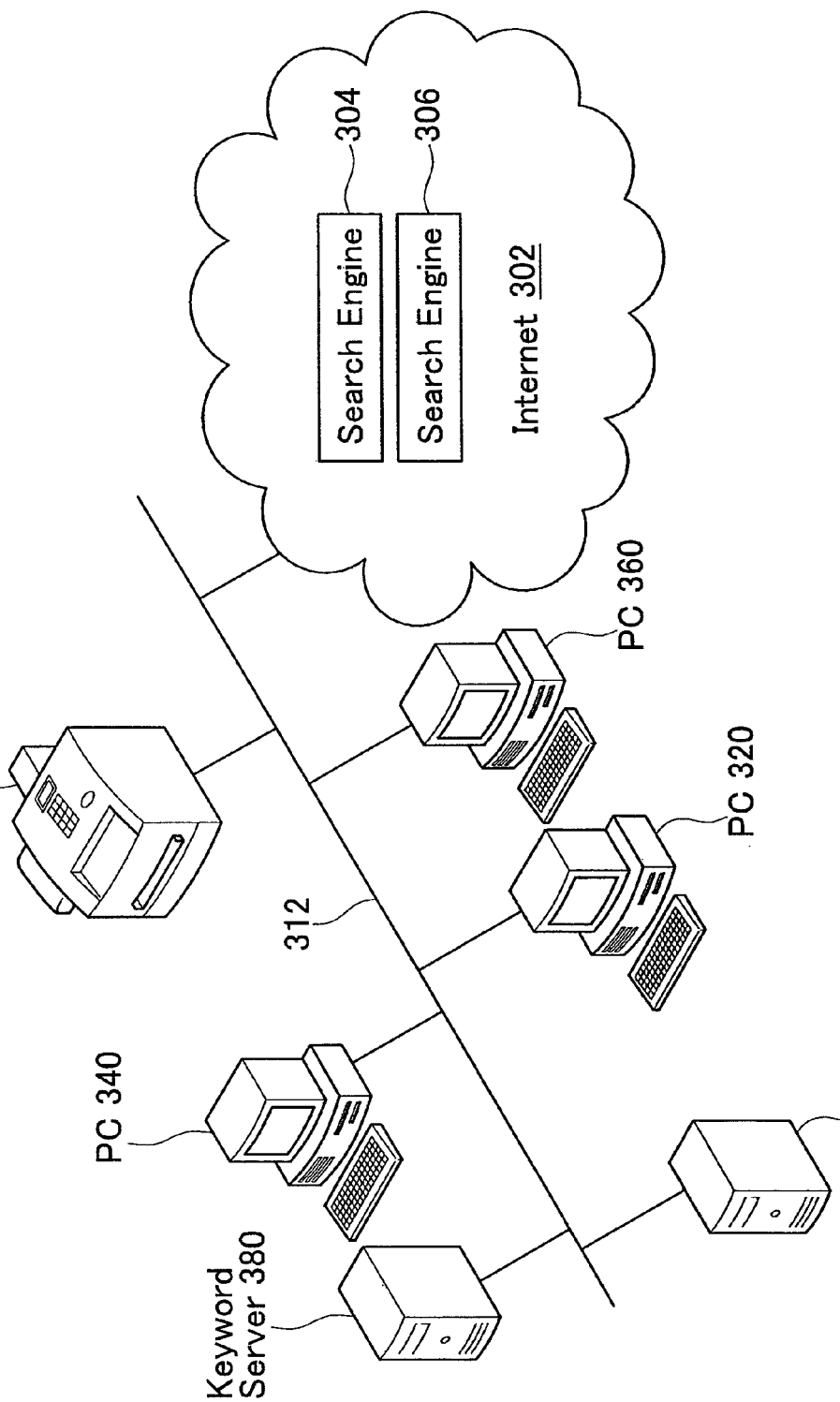
FIG. 22 is an overall view of a network system of a third embodiment.

FIG. 22 shows in simplified form the construction of a network system 310 of a third embodiment. The network system 310 includes PCs 320, 340, 360, a keyword server 380, a user administration server 400, a multi function device 420, Internet 302, etc. The PCs 320, 340, 360, the keyword server 380, the user administration server 400, and the multi function device 420 are each constructed separately. The PCs 320, 340, 360, the keyword server 380, the user administration server 400, and the multi function device 420 are connected to a LAN or WAN via a HUB, router, etc. The PCs 320, 340, 360, the keyword server 380, the user administration server 400, and the multi function device 420 are capable of communicating with one another. A plurality of search engines 304, 306, etc. exists on the Internet 302.

(Construction of the PC)

Figure 23:
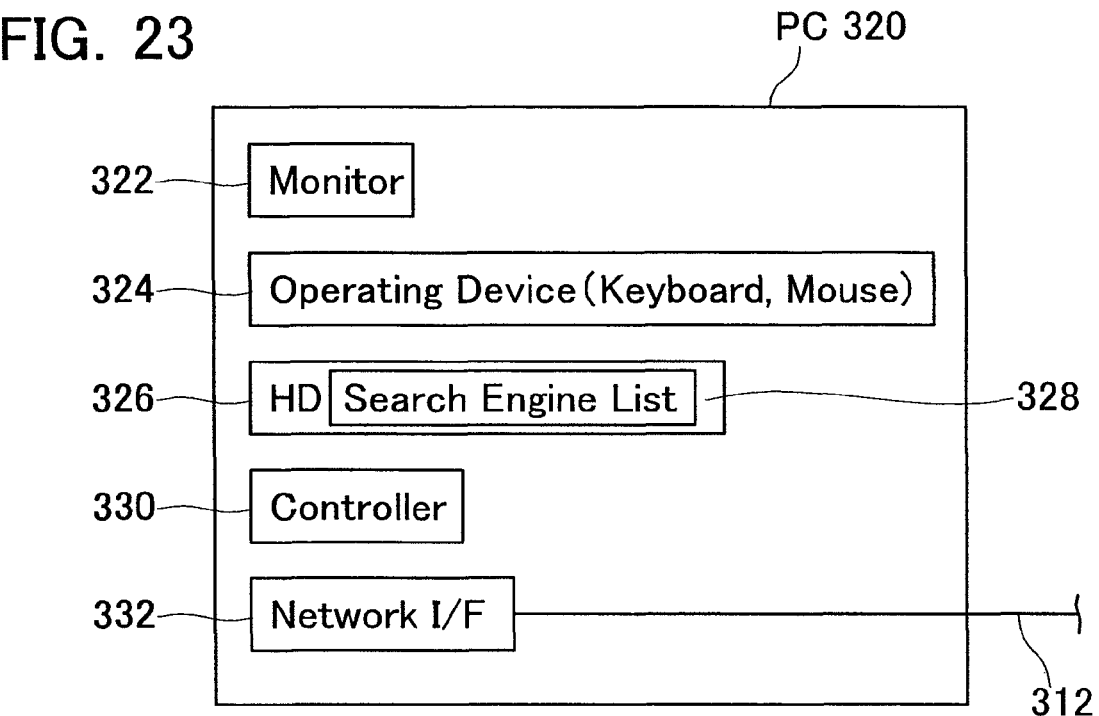
FIG. 23 shows the construction of a PC of the third embodiment.

FIG. 23 shows the construction of PC 320. The PC 320 includes each device 322, 324, 326, 330, 332 that are identical to the PC 20 of the first embodiment. The HD 326 can store a search engine list 328. The search engine list 328 includes the URLs for the search engines 304, 306, etc. The search engine list 328 is set by a user. The controller 330 executes various processes in accordance with a preset program, and performs overall control of the operation of the PC 320. The processes executed by the controller 330 are described in detail below. A network cable 312 is connected to the network I/F 332. As shown in FIG. 22, the network cable 312 is connected to the Internet 302 via a HUB, router, etc. The PC 320 is capable of executing Internet communications via the network I/F 332. In addition, the network cable 312 is connected to the network server 380 via a HUB, router, etc. The PC 320 is capable of communicating with the keyword server 380 and the user administration server 400 via the network I/F 332.

The PC 340, 360 has the same construction as the PC 320. Thus a detailed description is omitted. The PC 340, 360, like the PC 320, is connected with the keyword server 380 and the user administration server 400 so as to be capable of communication therewith. Note that the number of PCs arranged in the network system 310 of the present embodiment is not limited. In the present embodiment, the PCs are limited to the three PCs 320, 340, 360 in order to simplify the description.

(Construction of the Keyword Server)

Figure 24:
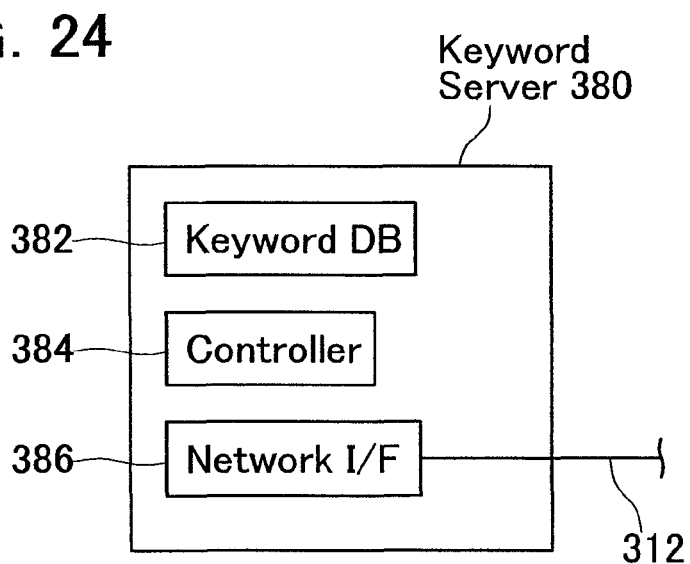
FIG. 24 shows the construction of a keyword server of the third embodiment.

FIG. 24 shows the construction of the keyword server 380. The keyword server 380 includes a keyword database (keyword DB) 382 and each device 384 and 386 like the keyword server 40 of the first embodiment. FIG. 25 shows an example of the storage content of the keyword DB 382. The keyword DB 382 can store a plurality of combinations of a user ID 390 described below, a keyword 392, and a URL for a search engine 394. In addition, the keyword DB 382 can store a registration date and time 396 at which the keyword 392 was registered. The keyword DB 382 cumulatively stores a keyword, a URL, and a registration date and time for each user ID. A method for storing information in the keyword DB 382 is described in detail below. The controller 384 executes various processes in accordance with a preset program, and performs overall control of the operation of the keyword server 380. The processes executed by the controller 384 are described in detail below. A network cable 312 is connected to the network I/F 386. As shown in FIG. 22, the network cable 312 is connected to the PC 320 via a HUB, router, etc. The keyword server 380 can communicate with the PC 320 via the network I/F 386. In addition, the network cable 312 is connected to the multi function device 420 via a HUB, router, etc. The keyword server 380 can communicate with the multi function device 420 via the network I/F 386.

(Construction of the User Administration Server)

Figures 26, 27:
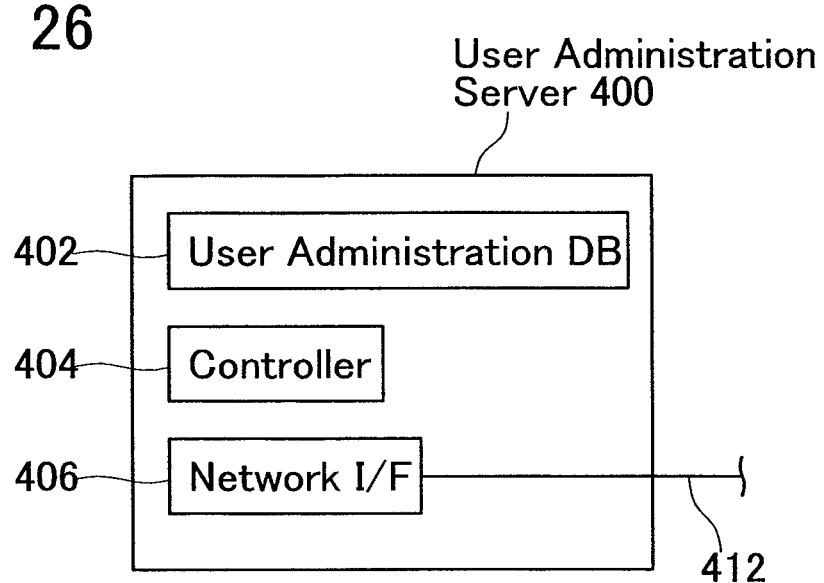
FIG. 26 shows the construction of a user administration server of the third embodiment.
FIG. 27 shows an example of the stored content of a user administration database of the third embodiment.

FIG. 26 shows the construction of the user administration server 400. The user administration server 400 includes a user administration database (user administration DB) 402, a controller 404, and a network interface (network I/F) 406. FIG. 27 shows an example of the storage content of the user administration DB 402. The user administration DB 402 stores a plurality of combinations. Combinations include the following: user IDs 410 that identify users, phone numbers 412 for telephones (not shown in the drawings) used by users, and node names 414 of PCs used by those users. A user ID 410 is assigned to each: user that uses a PC on the network system 310. The user IDs and node names of the present embodiment can be changed as needed. The phone number 412 may be a phone number of a portable telephone used by a user, or may be a phone number of a fixed telephone. In addition, the phone number 412 may be an internal number inside a company, or may be an IP address of an IP telephone. The controller 404 executes various processes in accordance with a preset program, and performs overall control of the operation of the keyword server 400. The processes executed by the controller 404 are described in detail below. A network cable 312 is connected to the network I/F 406. As shown in FIG. 22, the network cable 312 is connected to the PCs 320, 340, 360 via a HUB, router, etc. The keyword server 400 can communicate with the PC 320, 340, 360 via the network I/F 406. In addition, the network cable 312 is connected to the multi function device 420 via a HUB, router, etc. The keyword server 400 can communicate with the multi function device 420 via the network I/F 406.

The user administration DB 402 can be changed from each PC on the network system 310. For example, in a case where a new PC is added to the network system 310, the new PC is connected to the user administration server 400 via the network cable 312 so as to be capable of communication therewith. A user inputs a user ID, a phone number, and a node name from the operating device of the new PC. The user ID, phone number, and node name that were input are sent to the user administration server 400 via the network cable 312. The user administration server 400 receives the sent data via the network I/F 406. The controller 404 of the user administration server 400 stores the received data in the user administration DB 402.

(Construction of the Multi Function Device)

Figure 28:
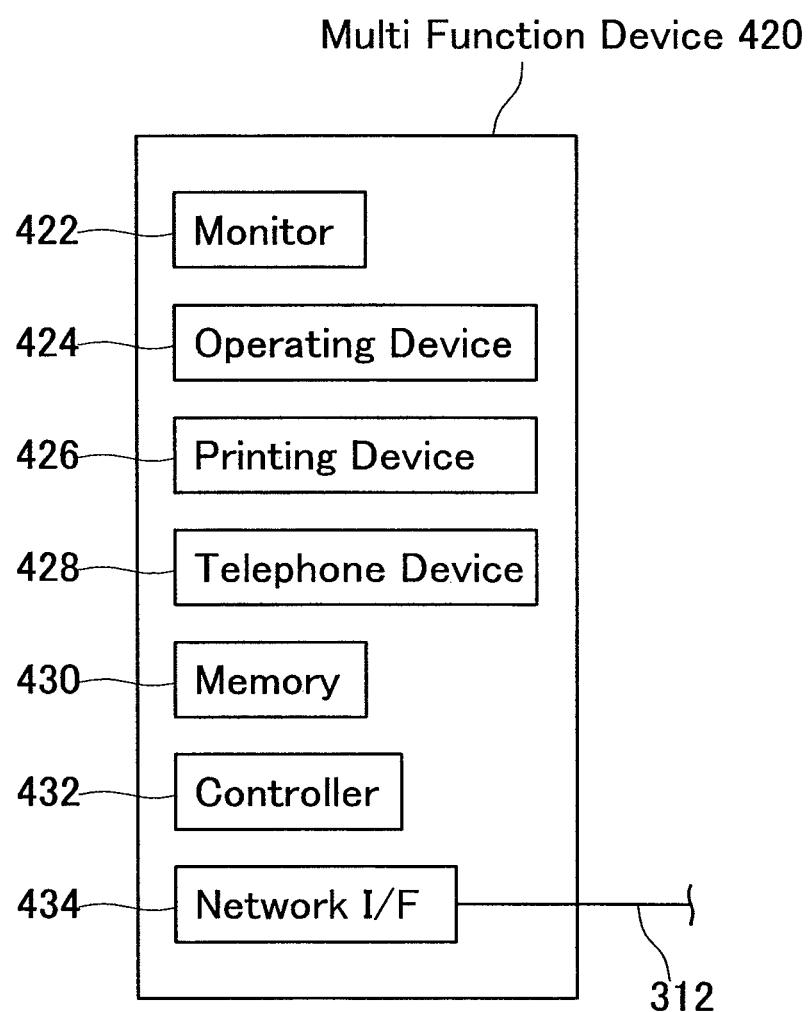
FIG. 28 shows the construction of a multi function device of the third embodiment.

FIG. 28 shows the construction of the multi function device 420. The multi function device 420 has each device 422, 424, 426, 430, 432, 434 that are identical to the multi function device 60 of the first embodiment, and a telephone device 428. The content of the information stored in the storage device 430 is described below as needed. The telephone device 428 can receive an incoming call from another telephone device (not shown in the drawings) and the phone number of the other telephone device. A user can use the telephone device 428 to communicate with a user of another telephone device. The controller 432 executes various processes in accordance with a preset program, and performs overall control of the operation of the multi function device 420. The processes executed by the controller 432 are described in detail below. A network cable 312 is connected to the network I/F 434. As shown in FIG. 22, the network cable 312 is connected to the keyword server 380 via a HUB, router, etc. The multi function device 420 is capable of communicating with the keyword server 380 and the user administration server 400 via the network I/F 434. In addition, the network cable 312 is connected to the Internet 302 via a HUB, router, etc. The multi function device 420 is capable of executing Internet communications via the network I/F 434.

(Overview of the Processes for Each Device)

Figure 29:
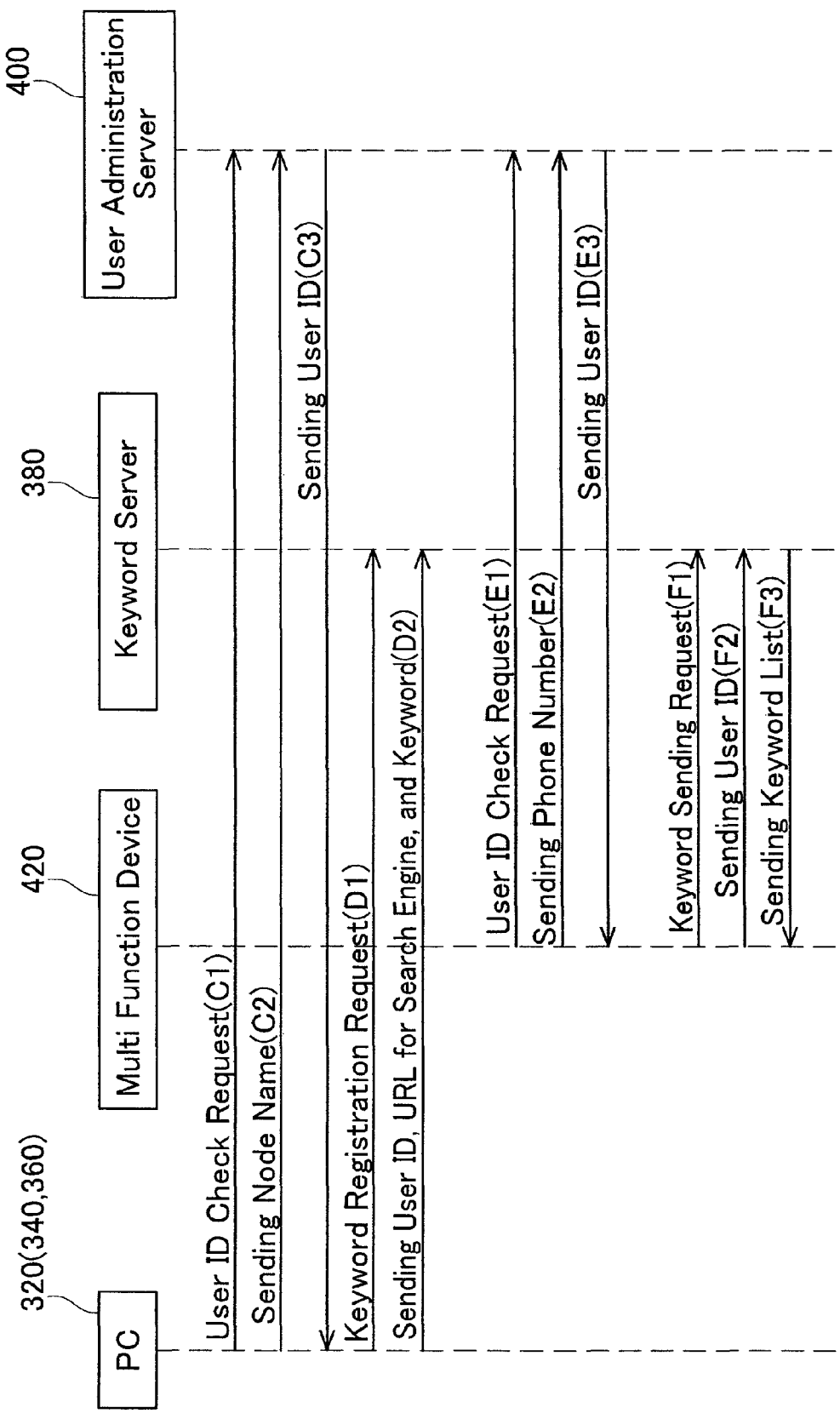
FIG. 29 shows a time chart of the processes executed by each device of the third embodiment.

Next, an overview of the processes executed by each of the aforementioned devices 320 (340, 360), 380, 400, 420 are described. FIG. 29 shows a time chart of the processes executed by each device 320, 380, 400, and 420. The user can select the search engine (e.g., the search engine 304 (see FIG. 22)) by operating the operating device 324 of the. PC 320 (see FIG. 23). In addition, the user can input a desired keyword into the PC 320. The PC 320 can execute a search process that sends the keyword input by the user to the selected search engine and acquires a search result. The PC 320 sends a user ID check request (C1) to the user administration server 400 in a case where a search process has been executed. The PC 320 sends the node name of the PC 320 to the user administration server 400 (C2) at the same time that the PC 320 checks the user ID (C1). The user administration server 400 sends to the PC 320 the user ID combined with the node name sent from the PC 320 and stored in the user administration DB 402 (see FIG. 27).

Next, the PC 320 requests a keyword registration from the keyword server 380 (D1). Next, the PC 320 sends the user ID sent from the user administration server 400, a URL for the search engine that executed the search process, and the keyword to the keyword server 380 (D2). In this way, the keyword server 380 can store a combination of the user ID, the URL for the search engine, and the keyword in the keyword DB 382 (see FIG. 25).

The telephone device 428 of the multi function device 420 receives an incoming call from another telephone device and the phone number of this telephone device. In this case, the multi function device 420 sends to the user ID check request to the user administration server 400 (E1). At the same time the multi function device 420 requests the user ID (E1), the telephone device 428 sends the received phone number (E2). The user administration server 400 sends to the multi function device 420 the user ID that is combined with the phone number sent from the multi function device 420 and stored in the user administration DB 402 (E3).

Next, the PC 420 requests a keyword sending (F1) to the keyword server 380. Next, the multi function device 420 sends the user ID that was sent from the user administration server 400 to the keyword server 380 (F2). The keyword server 380 identifies the keyword and search engine combined with the user ID sent from the multi function device 420 and stored in the keyword DB 382. The keyword server 380 sends a keyword list including the identified keyword and the URL for the search engine to the multi function device 420 as keyword candidate data (F3). The multi function device 420 can display the keyword and search engine sent from the keyword server 380 on the display device 422 (see FIG. 28). In a case where a plurality of keywords are included in the keyword list sent from the keyword server 380, the user can select one keyword from the plurality of displayed keywords by operating the operating device 424. In this case, the multi function device 420 can execute a search process that sends the keyword selected by the user to the search engine that was simultaneously sent with that keyword, and acquire a search result.

(Process of the PC)

Figure 30:
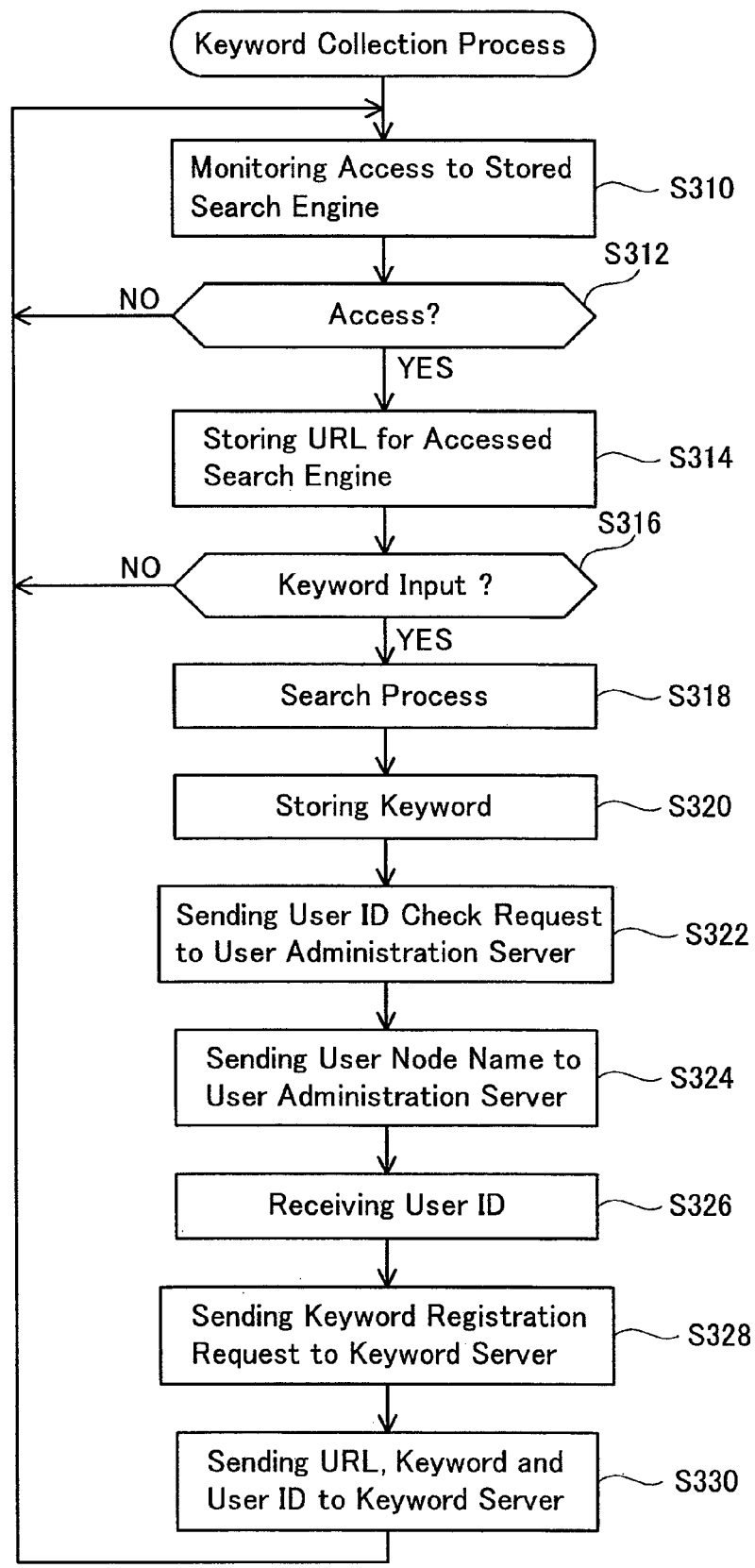
FIG. 30 shows a flowchart of a keyword collection process of the PC of the third embodiment.

Next, the processes executed by the PC 320 are described in detail. FIG. 30 shows a flowchart of the keyword collection process of the PC 320. As noted above, the HD 326 of the PC 320 stores the search engine list 328 (see FIG. 23). The search engine list 328 includes a plurality of search engine URLs. The user can access any search engine on the Internet 302 by operating the operating device 324. The controller 330 of the PC 320 monitors any URL included in the search engine list 328 accessed by the user (S310). In a case where any URL is accessed by the user, the controller 330 determines the answer is YES in S312. In this case, the controller 330 temporarily stores the accessed URL on the HD 326 (S314).

The user can input a desired keyword by operating the operating device 324. The controller 330 monitors whether the keyword was input by the user (S316). In a case where access to the search engine has been completed without inputting a keyword, the controller 330 determines the answer in S316 is NO. In this case, the controller 330 returns to S310 and monitors access to the search engine. However, in a case where a keyword has been input, the controller 330 determines the answer is YES in S316. In this case, the controller 330 sends the input keyword to the search engine being accessed and executes a search process that acquires a search result (S318). Although not illustrated in the flowchart, the controller 330 can display the search result acquired with the search process of S318 on the display device 322 (see FIG. 23).

The controller 330 temporarily stores the keyword executed by the search process on the HD 326 (S320). Next, the controller 330 sends a user ID check request to the user administration server 400 (S322 (see A1 of FIG. 29)). Next, the controller 330 sends the node name of the PC 320 to the user administration server 400 (S324 (see A2 of FIG. 29)). The user administration server 400 sends to the PC 320 the user ID that is combined with the node name of PC 320 and stored in the user administration DB 402. The controller 330 receives the user ID sent from the user administration server 400 via the network I/F 332 (S326 (see C3 of FIG. 29)). Next, the controller 330 sends a keyword registration request to the keyword server 380 (S328 (see D1 of FIG. 29)). Next, the controller 330 sends the URL for the search engine stored in S314, the keyword stored in S320, and the user ID received in S326 to the keyword server 380 (S330 (see D2 of FIG. 29)). In this way, the keyword collection process is complete.

(Processes of the Keyword Server)
(Main Process)

Figure 31:
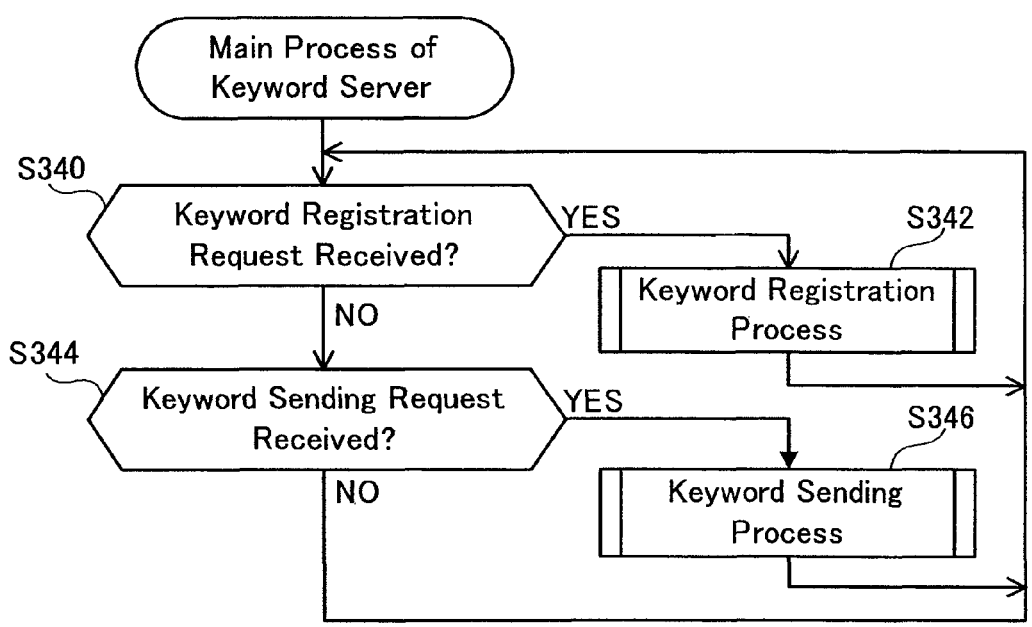
FIG. 31 shows a flowchart of a main process of the keyword server of the third embodiment.

Next, the processes executed by the keyword server 380 are described in detail. FIG. 31 shows a flowchart of the main process executed by the keyword server 380. The controller 384 of the keyword server 380 (see FIG. 24) monitors whether the keyword registration request sent from the PC 320 (see D1 of FIG. 29, S328 of FIG. 30) has been received (S340). In the case where the keyword registration request has been received (YES in S340), the controller 384 executes the keyword registration process (S342). The keyword registration process is described in detail below. In addition, the controller 384 monitors whether the keyword sending request sent from the multi function device 420 (see F1 of FIG. 29, S418 of FIG. 36 described below) has been received (S344). In a case where the keyword sending request has been received (YES in S344), the controller 384 executes the keyword sending process (S346). The keyword sending process is described in detail below.

(Keyword Registration Process)

Figure 32:
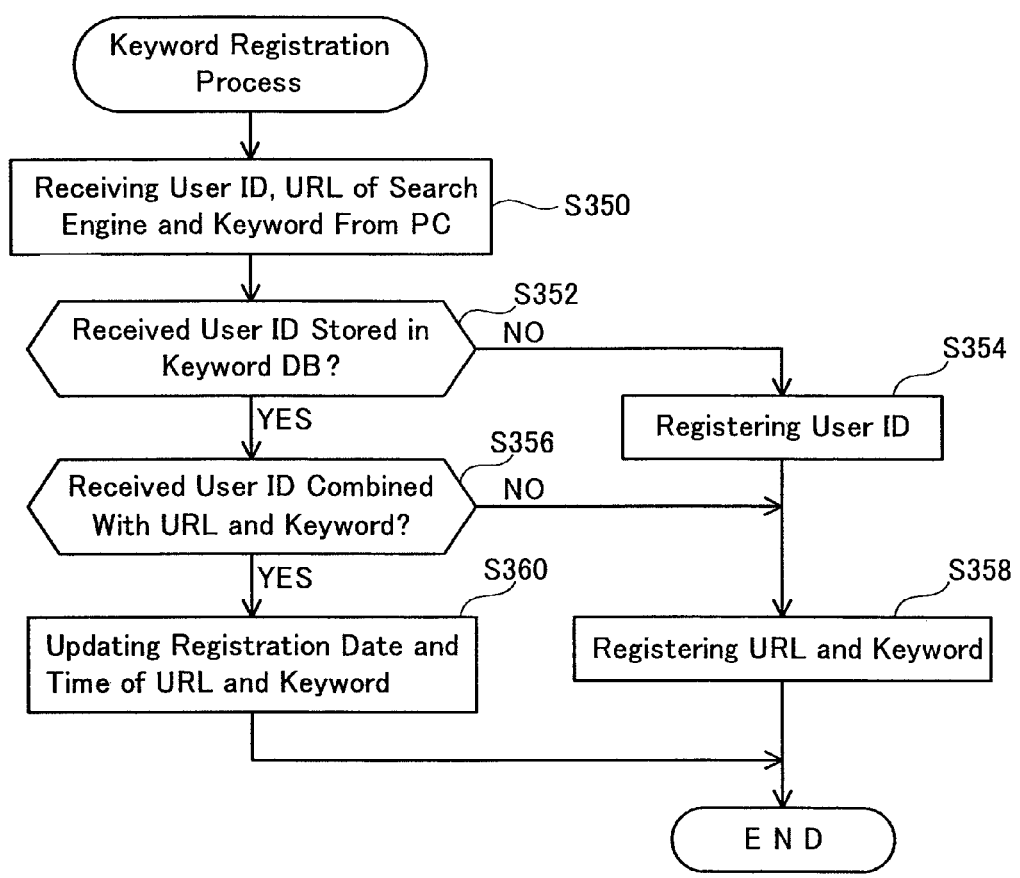
FIG. 32 shows a flowchart of a keyword registration process of the keyword server of the third embodiment.

FIG. 32 shows a flowchart of the keyword registration process of S342 of FIG. 31. The controller 384 receives the URL for the search engine, the keyword, and the user ID received from the PC 320 (see D2 of FIG. 29, S330 of FIG. 30) (S350). The controller 384 confirms whether the user ID received in S350 is in the keyword DB 382 (see FIG. 24) (S352). In a case where the user ID is not in the keyword DB 382 (NO in S352), the controller 384 stores the user ID received in S350 in the keyword DB 382 (S354). After S354 is finished, the flow proceeds to S358. However, in a case where the user ID is in the keyword DB 382 (YES in S352), the controller 384 confirms whether the URL for the search engine and the keyword received in S350 have been combined with the user ID in the keyword DB 382 (S356). In a case where the URL and the keyword received in S350 have not been combined with the user ID in the keyword DB 382 (NO in S356), the flow proceeds to S358.

In S358, the controller 384 stores a combination the URL for the search engine, the keyword, and the user ID received in S350 in the keyword DB 382. For example, in a case where S358 is to be executed via S354, the controller 344 stores the URL for the search engine and the keyword received in S350 with the registration date and time combined with the user ID newly stored in S354. However, in a case where S358 is to be executed via S356, the controller 384 stores the URL for the search engine and the keyword received in S350 with the registration date and time combined with the user ID stored in the keyword DB 382 (the user ID received in S350). After S358 is finished, the keyword registration process is complete. However, in a case where the URL and the keyword received in S350 have been combined with the user ID in the keyword DB 382 (YES in S356), the registration date and time combined with the URL for that search engine and the keyword are updated (S360). After S360 is finished, the keyword registration process is complete.

(Keyword Sending Process)

Figure 33:
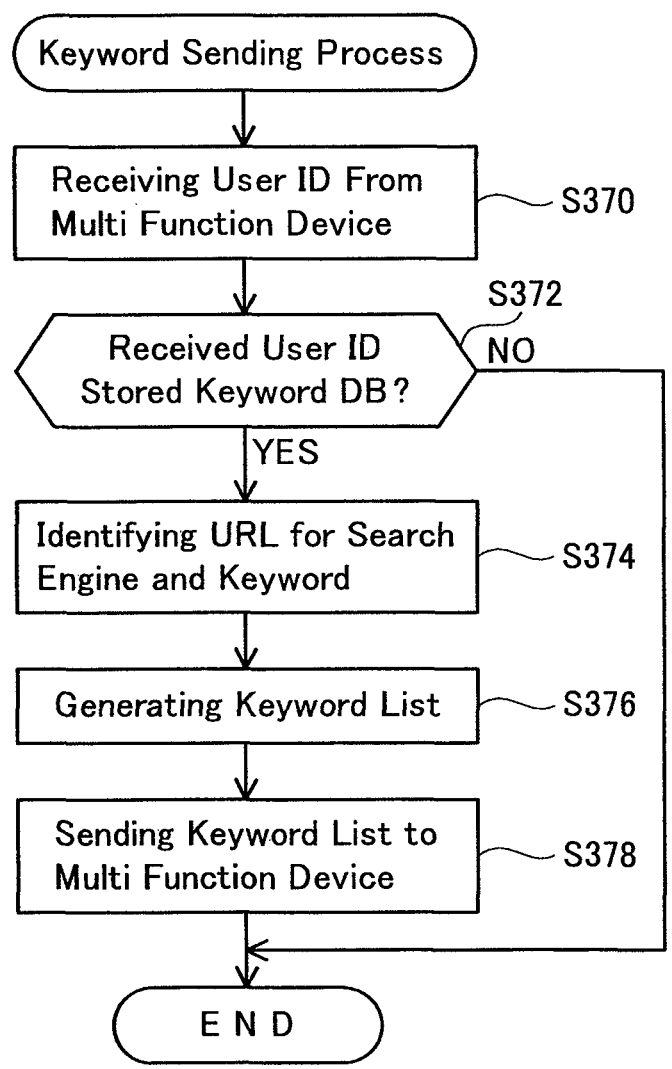
FIG. 33 shows a flowchart of a keyword sending process of the keyword server of the third embodiment.

FIG. 33 shows a flowchart of the keyword sending process of S346 of FIG. 31. The controller 384 receives the user ID sent from the multi function device 420 (see F2 of FIG. 29, S420 of FIG. 36 described below) (S370). The controller 384 confirms whether the user ID received in S370 is in the keyword DB 382 (S372). In a case where the user ID received is not in the keyword DB 382 (NO in S372), the keyword sending process is complete. However, in a case where the user ID received is in the keyword DB 382 (YES in S372), the controller 384 identifies the keyword and URL for the search engine combined with the user ID received in S370 and stored in the keyword DB 382 (S374).

Next, the controller 384 generates a keyword list that includes keyword candidate data from the URLs for the search engines and the keywords identified in S374 (S376). For example, in a case where the number of keywords identified in S374 exceeds a predetermined number, the controller 384 may confirm the registration date and time of those keywords and generate a keyword list by choosing the predetermined number of the latest keywords only. Next, the controller 384 sends the keyword list generated in S376 to the multi function device 420 (S378 (see D3 of FIG. 29, and S422 of FIG. 36 described below)). In this way, the keyword sending process is complete.

(Process of the User Administration Server)
(User ID Sending Process)

Figure 34:
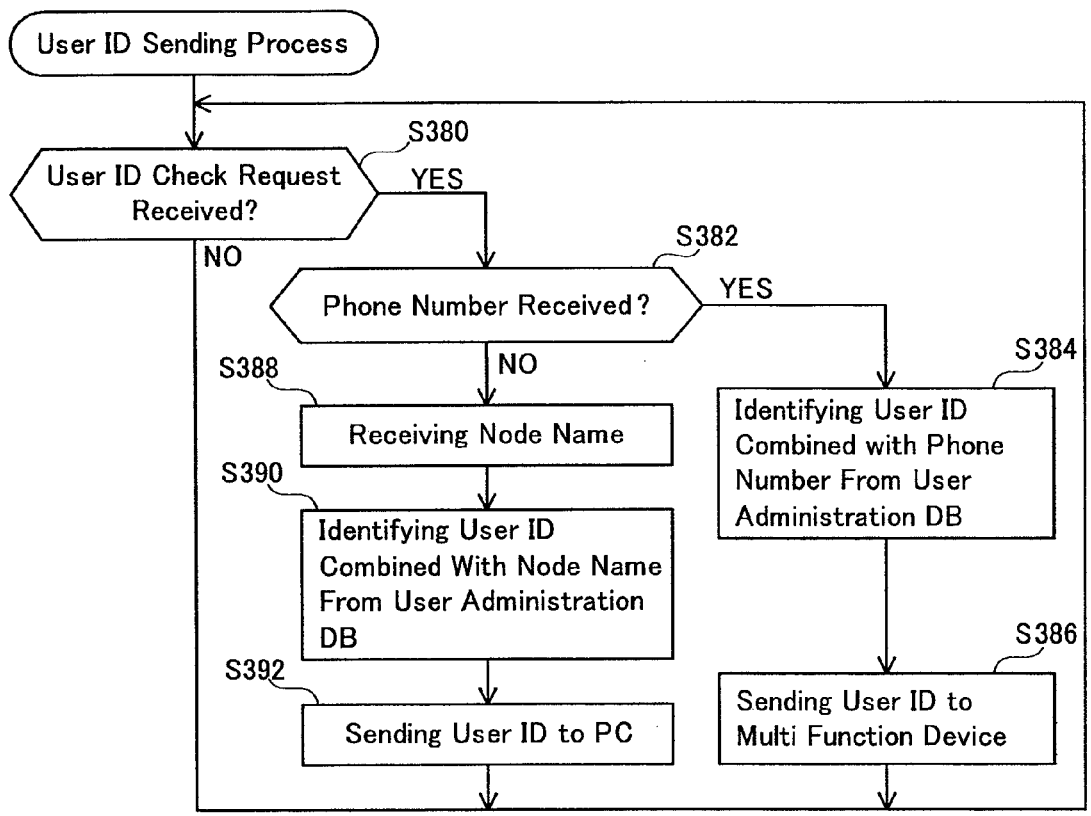
FIG. 34 shows a flowchart of a user ID sending process of the user administration server of the third embodiment.

Next, the content of the user ID sending process executed by the user administration server 400 is described in detail. FIG. 34 shows a flowchart of the process executed by the user administration server 400. The controller 404 of the user administration server 400 (see FIG. 26) monitors whether a user ID check request has been received from the PCs 320, 340, 360 or the multi function device 420 (S380 (see C1 or D1 in. FIG. 29, S322 of FIG. 30, and S412 of FIG. 36 described below)). In a case where the user ID check request has been received (YES in S380), the controller 404 confirms whether a phone number has been received (S382). In a case where the phone number has been received, (see E2 of FIG. 29, S414 of FIG. 36 described below) (YES in S382), the controller 404 identifies the user ID that is combined with the phone number received in S382 and stored in the user administration DB 402 (S384). Next, the controller 404 sends the user ID identified in S384 to the multi function device 420 (S386 (see E3 of FIG. 29, and S416 of FIG. 36 described below)). After S386 is finished, the flow returns to S380, and the controller 404 monitors whether a user ID check request has been received.

On the other hand, in a case where the phone number has not been received (NO in S382), the controller 404 receives the node name of the PC (S388 (see C2 of FIG. 29, S324 of FIG. 30). Next, the controller 404 identifies the user ID combined with the node name received in S388 and stored in the user administration DB 402 (S390). The user ID identified in S390 is sent to the PC that requested the user ID check (S392 (see C3 of FIG. 29, S326 of FIG. 30)). After S392 is finished, the flow returns to S380, and the controller 404 monitors whether a user ID check request has been received.

(Processes of the Multi Function Device)
(Main Process)

Figure 35:
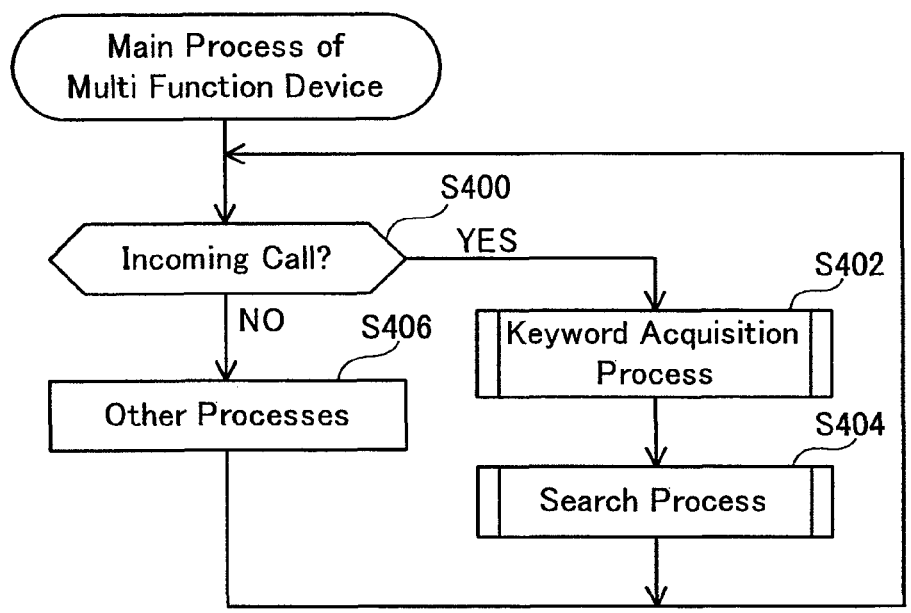
FIG. 35 shows a flowchart of the main process of the multi function device of the third embodiment.

Next, the processes executed by the multi function device 420 are described in detail. FIG. 35 shows a flowchart of the main process executed by the multi function device 420. The controller 432 (see FIG. 28) monitors whether the telephone device 428 (see FIG. 28) of the multi function device 420 has received an incoming call (S400). In a case where the telephone device 428 has received an incoming call (YES in S400), the controller 432 executes the keyword acquisition process (S402) and the search process (S404). These processes are described in detail below. However, in a case where a key of the operating device 424 (see FIG. 28) of the multi function device 420 has been operated, the controller 432 determines the answer is NO in S400. In this case, the controller 432 executes other processes in response to the type of key that was operated (S406).

(Keyword Acquisition Process)

Figure 36:
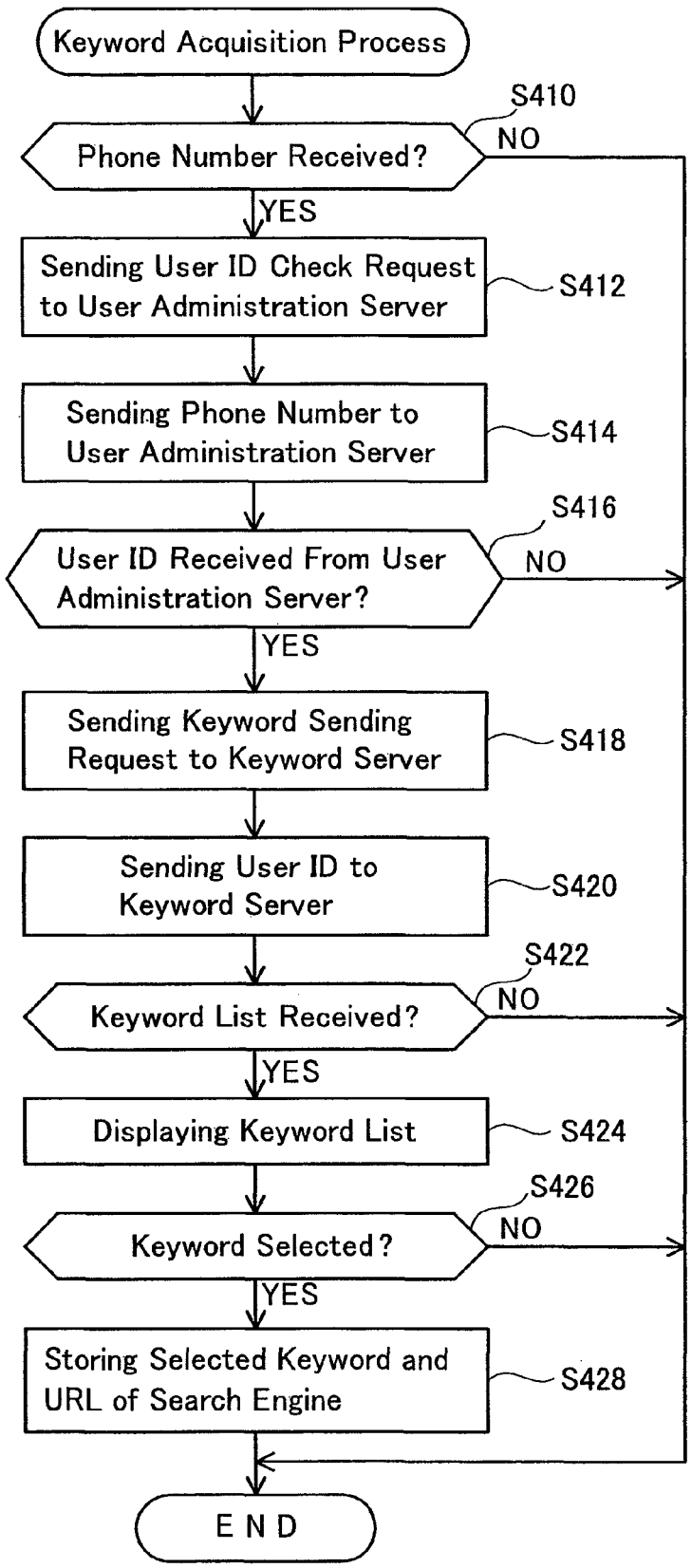
FIG. 36 shows a flowchart of a keyword acquisition process of the multi function device of the third embodiment.

FIG. 36 shows a flowchart of the keyword acquisition process of S402 of FIG. 35. In a case where an incoming call has been received in the telephone device 428 in S400, the controller 432 monitors whether the telephone device 428 has received the phone number of the source (S410). In a case where the telephone device 428 has not received the phone number of the source (NO in S410), the controller 432 completes the keyword acquisition process. However, in a case where the telephone device 428 has received the phone number of the source (YES in S410), the controller 432 sends a user ID check request to the user administration server 400 (S412 (see E1 of FIG. 29)). Next, the controller 432 sends the phone number received in S410 to the user administration server 400 (S414 (see E2 of FIG. 29)). After the process of S414 is complete, the controller 432 monitors whether a user ID has been received from the user administration server 400 within a predetermined period of time (S416). In a case where the user ID has not been received from the user administration server 400 within the predetermined period of time (NO in S416), the controller 432 completes the keyword acquisition process. Or, the controller 432 may execute the process from S412 to S416 a predetermined number of times, and in the event that the answer is NO in S416, the controller 432 may complete the keyword acquisition process.

In contrast, in a case where the user ID has been received from the user administration server 400 within the predetermined period of time (YES in S416)(see E3 of FIG. 29), the controller 432 sends a keyword sending request to the keyword server 380 (S418 (see F1 of FIG. 29)). Next, the controller 432 sends the user ID received in S416 to the keyword server (S420 (see F2 of FIG. 29)). After the process of S420 is complete, the controller 432 monitors whether a keyword list, including a keyword and a URL for a search engine, has been received from the keyword server 380 within a predetermined period of time (S422). In a case where the keyword list has not been received from the keyword server 380 within the predetermined period of time (NO in S422), the controller 432 completes the keyword acquisition process. Or, the controller 432 may execute the process from S418 to S422 a predetermined number of times, and, the controller 432 may complete the keyword acquisition process.

Figure 38:
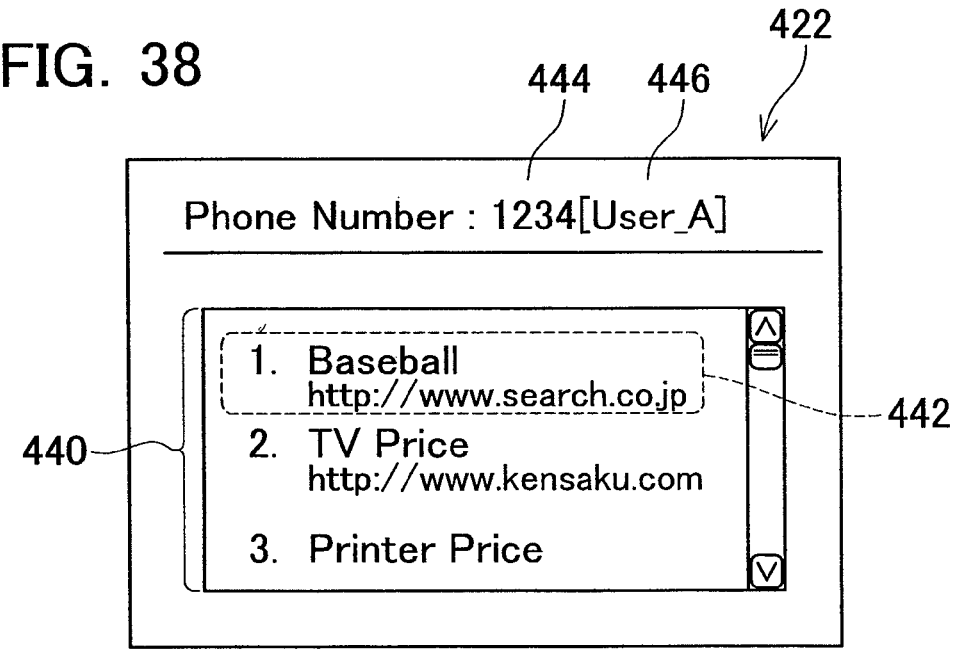
FIG. 38 shows an example of a screen of a monitor of the multi function device of the third embodiment for selecting a keyword.

However, in a case where the keyword list has been received from the keyword server 380 within the predetermined period of time (YES in S422), the controller 432 displays on the monitor 422 candidate data for the keyword and URL for the search engine received in S422 (S424). FIG. 38 shows an example of the candidate data 44 when an incoming call was received from phone number 1234. The monitor 422 can display the phone number 444 and the user ID 446. A user can move the cursor 442 up and down by operating the operating device 424. In this way, the user can select one keyword. The controller 432 monitors whether the user has operated the operating device 424 to select one keyword (S426). In a case where the user has not selected a keyword (NO in S426), the controller 432 completes the keyword acquisition process. However, in a case where the user has selected one keyword (YES in S426), the controller 432 temporarily stores the selected keyword and the URL for the search engine in the storage device 430 (see FIG. 26) (S428). In this way, the keyword acquisition process is complete.

(Search Process)

Figure 37:
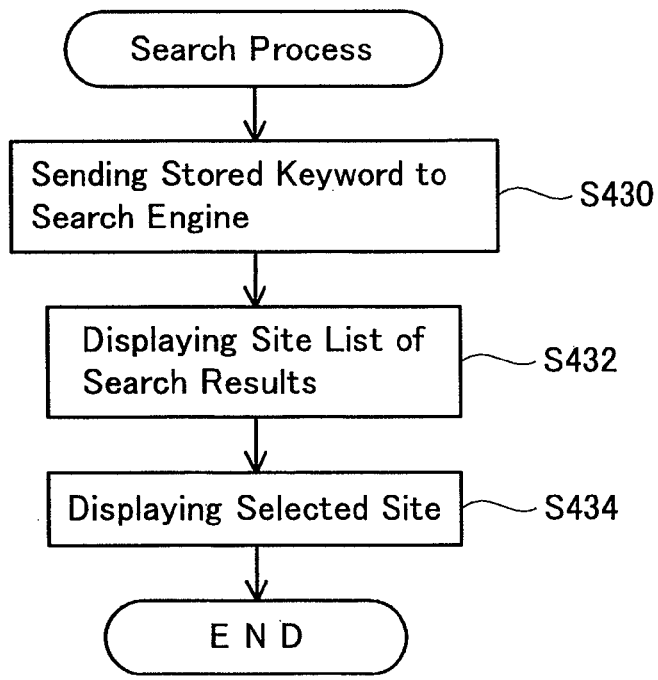
FIG. 37 shows a flowchart of a search process of the multi function device of the third embodiment.
Figures 39, 40:
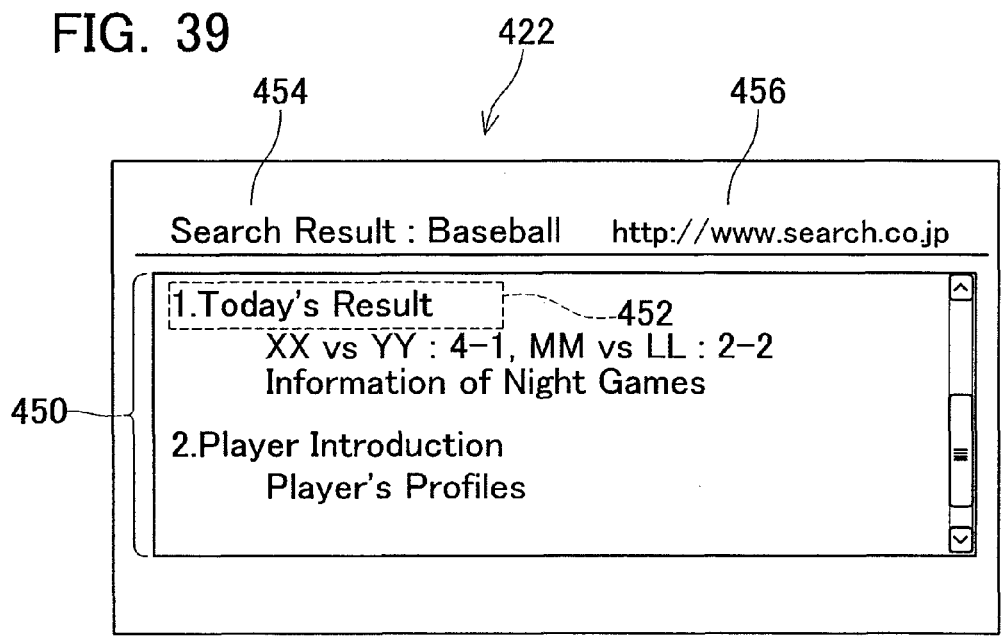
FIG. 39 shows an example of a screen of the monitor of the third embodiment displaying search results.
FIG. 40 shows an example of stored contents of a user administration database of a fourth embodiment.

FIG. 37 shows a flowchart of the search process of S404 of FIG. 35. The search process continues to be executed in S428 of FIG. 36. The controller 432 sends the keyword stored in S428 to the search engine stored in S428 (S430). The controller 432 acquires and displays the search result of the search engine (S432). FIG. 39 shows a display example of the search result. FIG. 39 shows the search result for the current keyword "baseball". A list 450 of a plurality of sites that include the keyword "baseball" is displayed on the monitor 422. In addition, the monitor 422 can display the keyword 454 used for the search process and the URL 456 of the search engine. Although not illustrated in the flowchart of FIG. 37, a user can print the list 450 by operating a key of the operating device 424. In this case, the user can view the list 450 printed on print media. In addition, a user can move the cursor 452 up and down by operating the operating device 424. In this way, the user can select one site. In this case, the controller 432 makes the monitor 422 display the selected site (S434). Although not illustrated in the flowchart, a user can print the selected site by operating a key of the operating device 424. Note that the controller 432 may be designed such that when one site is selected by the user, that site is automatically printed. When the site is displayed (or printed) in S434, the search process is complete.

The network system 310 of the third embodiment has been described in detail. In this system 310, the keywords searched with PCs 320, 340, 360 are accumulated in the keyword server 380. In a case where a user calls a telephone on the multi function device 420, a keyword is identified by the keyword server 380 based upon the phone number. The multi function device 420 can execute a search process for the keyword identified by the keyword server 380. For example, assume a user X learned of information on a site with PC 320, and wants to inform a user Y of the multi function device 420 of that information. The user X calls the telephone on the multi function device 420 from a telephone having a phone number stored in the user administration server 400. In this way, the multi function device 420 can acquire from the keyword DB 382 a keyword executed in a search process by the user X. When the user Y receives the telephone call, the keyword is identified with the multi function device 420. In the case where the user Y uses a keyword that was executed in a search process by the PC 320 in order to execute a search process from the multi function device 420, there is no need to newly input the keyword. With this system 310, there is no need for the user Y to input a keyword. Because of this, a user can eliminate the burden of inputting a keyword into a device that does not have a keyboard, such as the multi function device 420.

In addition, because there is no need to input a keyword, the user Y can easily execute a search process with the multi function device 420 while speaking to user X. In addition, in a case where user X informs user Y of a keyword by telephone, errors may occur such as misspeaking or mishearing. Furthermore, for example, in a case where the keyword is a homophone such as the word "pair" and "pear". With this system 310, these errors are reduced because the keyword is identified without being input by a user.

In addition, for example, even when the multi function device 420 includes a keyboard, the user of the multi function device 420 sometimes grasps the telephone device with one hand. In this case, it is difficult for the user to input a keyword into the multi function device. Because the system 310 can eliminate the burden on the user of inputting a keyword into the multi function device, the system 310 functions effectively in these situations.

In addition, with the system 310, the keyword DB 382 sends to the multi function device a keyword and a URL for the search engine to which the keyword was sent. The multi function device 420 can search with the same search engine as a PC. In this way, the same search results as a PC can be acquired.

With this system 310, the node name of each PC (communication device identification information) is combined with the phone number (telephone identification information) of a user, and can be registered in advance in the user administration DB 402 of the user administration server 400. The keywords executed in a search process by each PC are combined with the node name of the PC and stored in the keyword DB 382 of the keyword server 380. When there is an incoming call to the telephone device 428 of the multi function device 420, and the received phone number is the phone number of the user X, the node name of the PC is identified from the user administration DB 402. The keyword combined with the identified node name in the keyword DB 382 is acquired by the multi function device 420. In contrast, when there is an incoming call to the multi function device 420, and the phone number of the source is not stored in the user administration DB 402, the node name of the PC is not identified from the user administration DB 402. This results in the keyword not being acquired by the multi function device 420. In other words, the multi function device 420 does not acquire a keyword in response to all incoming calls, but acquires a keyword only when the incoming call is from a telephone device having a phone number that is pre-registered in the user administration DB 402.

In this system 310, there is a one to one relationship between the keyword stored in the keyword DB 382 and the phone number received with the multi function device 420. Because of that, even if a large number of keywords are stored in the keyword DB 382, the keyword server 380 can identify only the keyword that corresponds to the received phone number. Because of that, the keywords acquired by the multi function device 420 can be restricted. A user can omit the task of searching for a keyword.

This system 310 is particularly effective in cases where a plurality of PCs is included. Like the system 310 of the third embodiment, there are three. PCs, and the node names of these are assumed to be M1, M2. In addition, the user of one PC is assumed to be X1, and the user of the other PC is assumed to be X2. In this case, the user administration DB 402 of the user administration server 400 can store a combination of the phone number of the user X1 and M1, and a combination of the phone number of the user X2 and M2. The combination of a keyword (e.g., "baseball") and M1, and the combination of a keyword (e.g., "basketball") and M2, are stored in the keyword DB 382 of the keyword server 380. For example, when there is an incoming call to the telephone device 428 of the multi function device 420, and the phone number is the phone number of the user X1, M1 is identified from the user administration DB 402, and the keyword "baseball" combined with M1 is acquired by the multi function device 420. Likewise, when there is an incoming call to the telephone device 428, and the phone number is the phone number of the user X2, M2 is identified from the user administration DB 402, and the keyword "basketball" combined with M2 will be acquired by the multi function device 420. In this system 310, one PC out of the plurality of PCs can be identified based on the phone number of the incoming call to the telephone device 428. The multi function device 420 can acquire a keyword that was executed in a search process with the identified PC.

(Fourth Embodiment)

Next, a fourth embodiment of the present teaching is described. Here, the differences with the third embodiment are described.

(Construction of the User Administration Server)

In the fourth embodiment, the construction of the user administration DB 402 of the user administration server 400 is different from the third embodiment. FIG. 40 shows an example of the storage content of the user administration DB 402 of the fourth embodiment. The user administration DB 402 can store a combination of a user ID 410 that identifies a user and a phone number 412 of a telephone (not shown in the drawings) used by that user. The user administration DB 402 does not store the node names of PCs.

(Overview of the Processes for Each Device)

Figure 41:
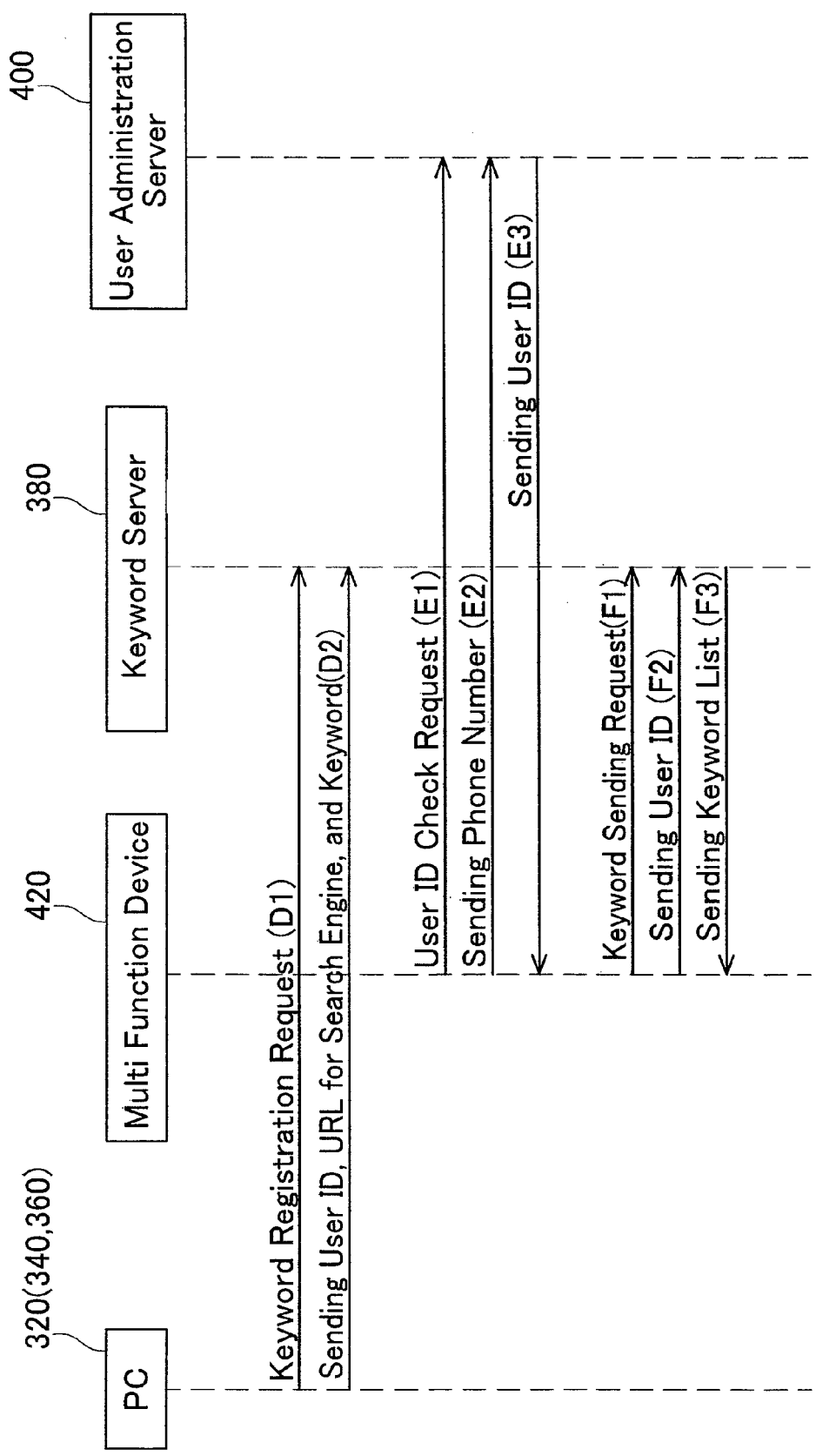
FIG. 41 shows a time chart of the processes executed by each device of the fourth embodiment.

FIG. 41 shows a time chart of the processes executed by each device 320, (340, 360), 380, 400, and 420. The user can select the search engine (e.g., the search engine 304 (see FIG. 22)) and input a desired keyword, as well as input a user ID, by operating the operating device 324 of the PC 320 (see FIG. 23). In a case where a search process is executed, the PC 320 does not perform the processes C1-C3 shown in FIG. 29 of the third embodiment, but the PC 320 sends a keyword registration request (D1) to the keyword server 380. The processes from D2 to F3 are identical to those of the third embodiment: (the processes from D2 to F3 of FIG. 29). Because of this, a description of D2 to F3 is omitted. In this way, the keyword server 380 can store a combination of the user ID, the URL for the search engine, and the keyword in the keyword DB 382 (see FIG. 25).

(Process of the PC)

Figure 42:
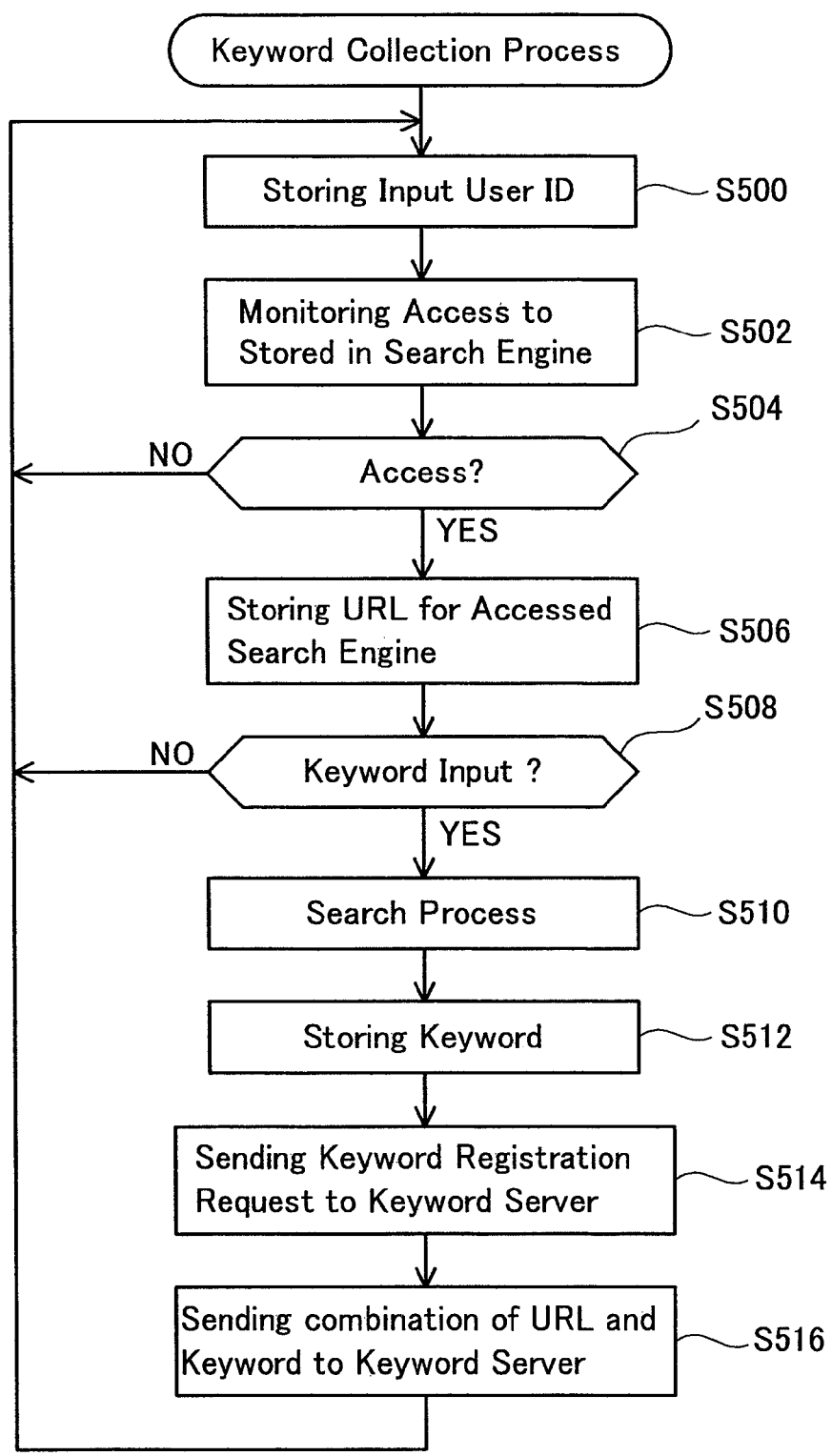
FIG. 42 shows a flowchart of a keyword collection process of a PC of the fourth embodiment.

Next, the process executed by the PC 320 is described in detail. FIG. 42 shows a flowchart of the keyword collection process executed by the PC 320. As noted above, the user can input a user ID by operating the operating device 324. The controller 330 of the PC 320 stores the input user ID on the HD 326 (S500). The processes from S502 to S512 are identical to the processes from S310 to S320 of the third embodiment (see FIG. 30). The processes S514 and S516 are identical to the processes S328 and S330 of the third embodiment (see FIG. 30). Because of this, a description of S502 to S516 is omitted. In this way, the keyword, the URL for the search engine, and the user ID are sent as a combination to the keyword server 380.

(Processes of the User Administration Server)
(User ID Sending Process)

Figure 43:
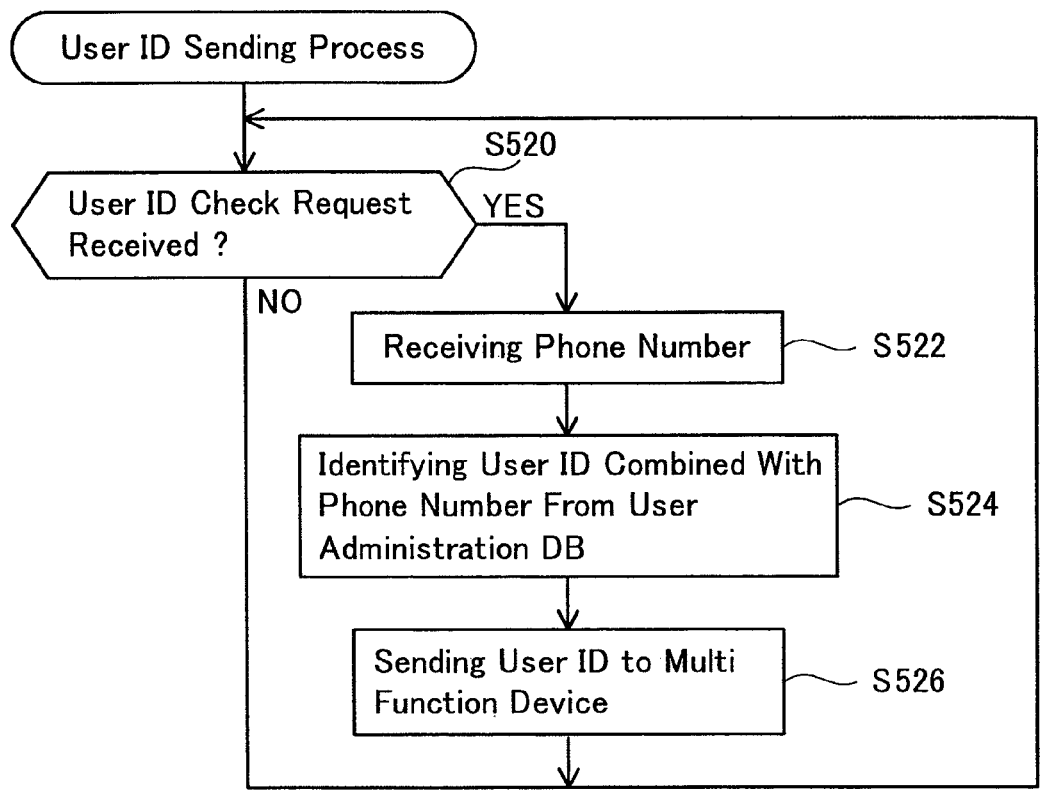
FIG. 43 shows a flowchart of a user ID sending process of a user administration server of the fourth embodiment.

FIG. 43 shows a flowchart of the process executed by the user administration server 400. The controller 404 of the user administration server 400 (see FIG. 26) monitors whether a user ID check request has been received from the multi function device 420 (see S520 (see E1 of FIG. 42)). In a case where the request has been received (YES in S520), the controller 404 receives the phone number (S522 (see E2 of FIG. 43)). The processes S524 and S526 are identical to the processes S384 and S386 of the third embodiment (see FIG. 34). Because of this, a description of S524 and S526 is omitted. Due to the fourth embodiment, it is not necessary for a user to input a keyword when performing the same search as a PC with the multi function device 420. The burden on the user of inputting a keyword can be eliminated.

The network system 310 of the fourth embodiment is useful where one PC is shared among a plurality of users. For example, assume that a user X1 and a user X2 can share one PC. In addition, for example, assume that the user ID of user X1 is N1, and the user ID of user X2 is N2. In this case, the user administration DB 402 of the user administration server 400 can store a combination of the phone number of the user X1 and N1, and a combination of the phone number of the user X2 and N2. The combination of a keyword (e.g., "baseball") and N1, and the combination of a keyword (e.g., "basketball") and N2, are stored in the keyword DB 382 of the keyword server 380.

For example, when there is an incoming call to the telephone device 428 of the multi function device 420, and the phone number is the phone number of the user X1, N1 is identified from the user administration DB 402, and the keyword "baseball" combined with N1 is acquired by the multi function device 420. Likewise, when there is an incoming call to the telephone device 428, and the phone number is the phone number of the user X2, N2 is identified from the user administration DB 402, and the keyword "basketball" combined with N2 is acquired by the multi function device 420. With the system 310 of the fourth embodiment, even if one PC is used by a plurality of users, a single user can be identified based on the phone number of the incoming call to the multi function device 420. The multi function device 420 can acquire a keyword that was executed in a search process by the identified user. A plurality of users can be identified even from one PC by inputting a user ID.

Although specific examples were described in detail above, these are merely illustrations, and do not limit the scope of the patent claims. The technology described in the scope of the patent claims includes various modifications and changes to the specific examples illustrated above. Variant embodiments of the aforementioned embodiments are provided below.

(Variant Embodiment 4)

Figure 44:
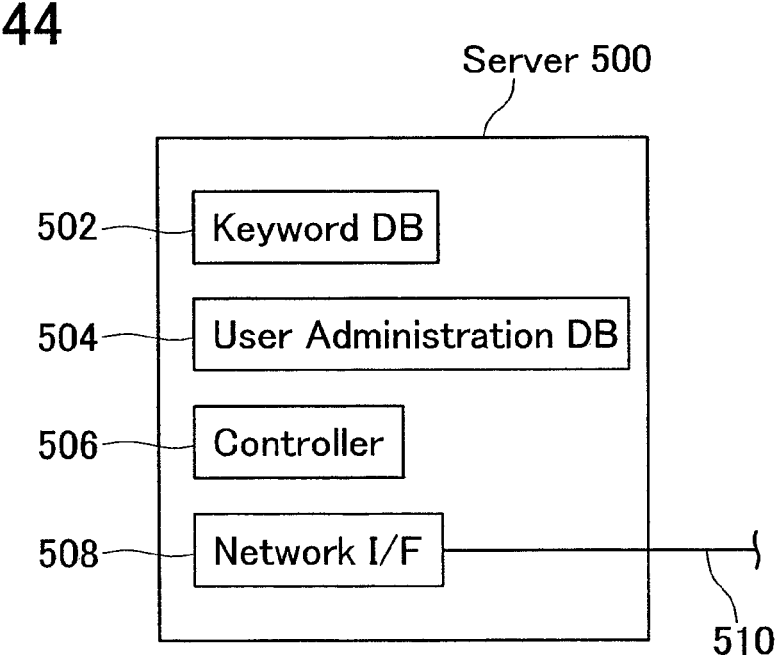
FIG. 44 shows the construction of a server of a variant embodiment 4.

With each of the third and fourth embodiments, the keyword server 380 is constructed separately from the user administration server 400. However, the keyword server 380 and the user administration server 400 may be one server. In this case, the server 500 can use the construction of FIG. 44. In other words, the server 500 includes a user administration database (user administration DB) 504, in addition to a keyword database (keyword DB) 502, and each device 506 and 508 that are identical in construction as in the keyword server 380 of the third embodiment. The server 500 is connected to the multi function device 420 and PCs 320, 340, 360 via the network cable 510. In the present embodiment, each process that is executed between the PCs 320, 340, 360, the multi function device 420, the keyword server 380, and the user administration server 400 of the third and fourth embodiments, will be executed between the PCs 320, 340, 360, the multi function device 420, and the server 500.

(Variant Embodiment 5)

Figure 45:
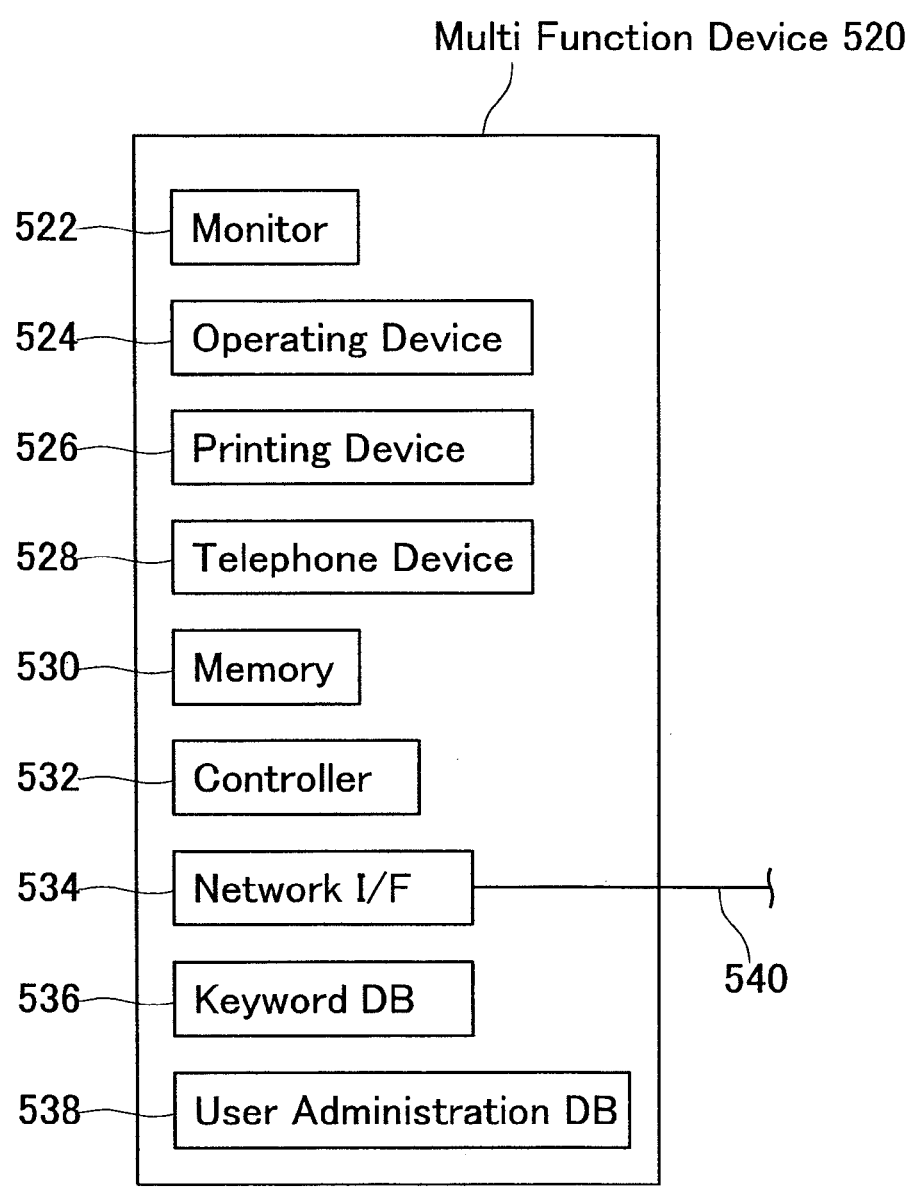
FIG. 45 shows the construction of a multi function device of a variant embodiment 5.

In each of the third and fourth embodiments, the keyword server 380 and the user administration server 400 are constructed separately from the PC 320, and are also constructed separately from the multi function device 420. However, a keyword database and a user administration database may be installed in the multi function device. In this case, the construction of FIG. 45 can be used. In other words, in addition to each device 522, 524, 526, 528, 530, 532, 534 of the same construction as the multi function device 420 in the third embodiment, the multi function device 520 also includes a keyword database (keyword DB) 536 and a user administration database (user administration DB) 538. The server 500 is connected to the multi function device 420 and PCs 320, 340, 360 via the network cable 510. Each process executed by the PC 320, 340, 360 and the multi function device 520 of the present variant embodiment can be implemented by making slight changes in each flowchart of the aforementioned third embodiment and fourth embodiment (FIGS. 30-36).

(Variant Embodiment 6)

Figure 46:
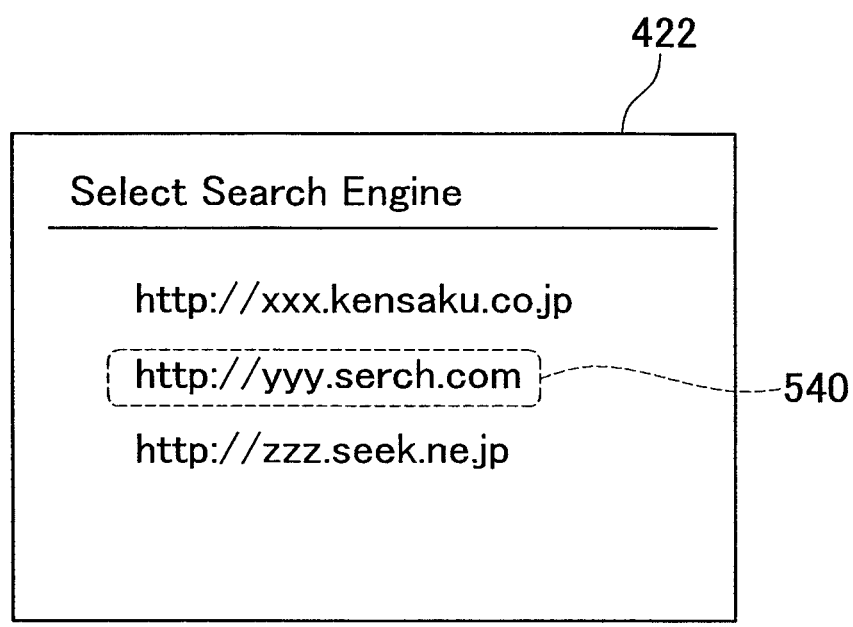
FIG. 46 shows an example of a screen of a monitor of a multi function device of a variant embodiment 6 for selecting a keyword.

In each of the third and fourth embodiments, the keyword DB 382 stores keywords and the URLs for the search engines to which the keywords were sent. Then, the URLs for the search engines are formed into sets with the keywords, and sent and received between each device. However, the keyword database need not store the search engines. Each device sends and receives only the keywords. In this case, a search engine list that is identical to the search engine list 328 of the PC 320 may be stored in the storage device 430 of the multi function device 420. When a user selects one keyword from the keyword candidate data displayed on the display device 422 of the multi function device 420, the controller 432 of the multi function device 420 displays the search engine list on the monitor 422. FIG. 46 shows a display example of the search result. Although the URL for each search engine is displayed in FIG. 46, the name of each search engine may instead be displayed. A user can move the cursor 540 up and down by operating the operating device 424. In this way, the user can select one search engine. When a search engine is selected, the controller 432 sends the selected keyword to the selected search engine.

(Variant Embodiment 7)

A device other than the PC 320 can be used to construct the system. For example, a multi function device may be used instead of the PC 320 to construct the system. Likewise, PCs 340, 360 may replace the multi function device. In other words, the system may be constructed from a plurality of multi function devices, a plurality of PCs, and a keyword server. In addition, a device other than the multi function device 360 can be used to construct the system. For example, a PC may be used instead of the multi function device 360 to construct the system. In this case, the system is constructed by means of a plurality of PCs and a keyword server.

(Variant Embodiment 8)

Each of the aforementioned embodiments (from the first to fourth embodiments) uses search engines on the Internet. However, each of the aforementioned embodiments need not necessarily use search engines on the Internet, and may use a search engine on a LAN. In other words, the technology disclosed in each of the embodiments can be implemented in a system constructed with a LAN only, without being connected to the Internet.

Each of the aforementioned embodiments is particularly useful when, for example, there are devices that require the task of inputting a keyword into the network system. For example, because a PC includes a keyboard, a user can use the keyboard to easily input a keyword into the PC. In contrast, because a multi function device does not include a keyboard, it will be difficult for a user to input a keyword into the multi function device. Because the network system of each of the aforementioned embodiments can assist a user with the task of inputting a keyword into the multi function device, the network system will function effectively in these situations.

In addition, the technological elements described in the present specification or drawings exhibit technological utility either individually or in various combinations, and are not limited to the combinations claimed at the time of application. In addition, the technology illustrated in the present specification or the drawings simultaneously achieve a plurality of objects, and achieving one object from amongst these has technological utility in and of itself.

What is claimed is:

1. A network system, comprising:
a first communication device;
a second communication device composed separately from the first communication device; and
a server comprising a keyword database,
wherein the first communication device comprises:
  a first input device that allows a user to input a keyword; and
  a first search device capable of carrying out a first search process that includes sending the keyword input to the first input device to a search engine and receiving a search result,
wherein the keyword database cumulatively stores a plurality of keywords used for a plurality of first search processes,
wherein
the second communication device includes a printing function, a scan function or a combination thereof, and
the second communication device comprises:
  a second input device that allows a user to input a part of characters included in a character string composing one word;
  a keyword acquisition device capable of acquiring, when only the part of characters is input to the second input device, a specific keyword including the part of characters input to the second input device from the keyword database which is cumulatively storing the plurality of keywords; and
  a second search device capable of carrying out a second search process that includes sending the specific keyword acquired by the keyword acquisition device to a first search engine and receiving a search result,
wherein the server further comprises a keyword identifying device that identifies, from the keyword database, the specific keyword including the part of characters input to the second input device, and
wherein the keyword acquisition device acquires the specific keyword identified by the keyword identifying device.

2. The network system as in claim 1, wherein:
the second input device further allows the user to select the first search engine; and
the second search device is capable of carrying out the second search process that includes sending the specific keyword acquired by the keyword acquisition device to the selected first search engine.

3. The network system as in claim 2, wherein:
the keyword database stores, for each of the plurality of keywords, a combination of the keyword and search engine identification information of a search engine to which the keyword was sent in the first search process; and
the keyword identifying device identifies, from the keyword database, the specific keyword including the part of characters and combined with first search engine identification information of the selected first search engine.

4. The network system as in claim 2, wherein:
the second communication device further comprises:
  a last keyword storage device that stores the specific keyword used for a last second search process, and
  a last search engine storage device that stores the first search engine identification information of the selected first search engine used for the last second search process;
the second input device further allows the user to select a second search engine after the last second search process,
in a case where the first search engine identified by the first search engine identification information stored in the last search engine storage device is different from the second search engine, the second search device is capable of carrying out a new second search process that includes sending the specific keyword stored in the last keyword storage device to the selected second search engine.

5. A second communication device to be connected with a server in a communicable manner, the server comprising a keyword database cumulatively storing a plurality of keywords used for a plurality of search processes carried out by a first communication device, and the second communication device having a printing function, a scan function or a combination thereof, the second communication device comprising:
  an input device that allows a user to input a part of characters included in a character string composing one word;
  a keyword acquisition device capable of acquiring, from the keyword database which is cumulatively storing the plurality of keywords, when only the part of characters is input to the input device, a specific keyword including the part of characters input to the input device identified by the server; and
  a search device capable of carrying out a search process that includes sending the specific keyword acquired by the keyword acquisition device to a search engine and receiving a search result.

6. A second communication device to be connected with a first communication device in a communicable manner and the second communication device having a printing function, a scan function or a combination thereof, the second communication device comprising:
- a keyword database that cumulatively stores a plurality of keywords used for a plurality of search processes by the first communication device;
- an input device that allows a user to input a part of characters included in a character string composing one word;
- a keyword acquisition device capable of acquiring, from the keyword database which is cumulatively storing the plurality of keywords, when only the part of characters is input to the input device, a specific keyword including the part of characters input to the input device; and
- a search device capable of carrying out a search process that includes sending the specific keyword acquired by the keyword acquisition device to a search engine and receiving a search result.

* * * * *